United States Patent
Tao et al.

(10) Patent No.: US 12,101,825 B2
(45) Date of Patent: Sep. 24, 2024

(54) USER EQUIPMENT INVOLVED IN PERFORMING A RANDOM ACCESS PROCEDURE

(71) Applicant: Panasonic Intellectual Property Corporation of America, Torrance, CA (US)

(72) Inventors: Ming-Hung Tao, Langen (DE); Hidetoshi Suzuki, Kanagawa (JP); Rikin Shah, Langen (DE); Hongchao Li, Langen (DE); Tetsuya Yamamoto, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 393 days.

(21) Appl. No.: 17/619,493

(22) PCT Filed: Jun. 19, 2020

(86) PCT No.: PCT/EP2020/067106
§ 371 (c)(1),
(2) Date: Dec. 15, 2021

(87) PCT Pub. No.: WO2021/018472
PCT Pub. Date: Feb. 4, 2021

(65) Prior Publication Data
US 2022/0183081 A1   Jun. 9, 2022

(30) Foreign Application Priority Data
Jul. 31, 2019   (EP) .................................... 19189391

(51) Int. Cl.
*H04W 74/0833*   (2024.01)
*H04W 74/00*   (2009.01)
(Continued)

(52) U.S. Cl.
CPC ..... *H04W 74/0841* (2013.01); *H04W 74/008* (2013.01); *H04W 74/02* (2013.01); *H04W 76/20* (2018.02)

(58) Field of Classification Search
CPC .......... H04W 74/0841; H04W 74/008; H04W 74/02; H04W 76/20; H04W 48/02; H04W 74/006; H04W 74/0833
See application file for complete search history.

(56) References Cited

U.S. PATENT DOCUMENTS

2018/0110074 A1   4/2018   Akkarakaran et al.
2019/0357265 A1   11/2019   Ren et al.
(Continued)

FOREIGN PATENT DOCUMENTS

WO   2018/127239 A1   7/2018

OTHER PUBLICATIONS

3GPP, "3rd Generation Partnership Project; Technical Specification Group Radio Access Network; Study on Licensed-Assisted Access on Unlicensed Spectrum (Release 13)," 3GPP TR 36.889 V13.0.0, Jun. 2015, 285 pages.
(Continued)

*Primary Examiner* — Ayaz R Sheikh
*Assistant Examiner* — Tarell A Hampton
(74) *Attorney, Agent, or Firm* — Seed IP Law Group LLP

(57) ABSTRACT

The present disclosure relates to a user equipment (UE) that comprises a receiver, which receives a plurality of random access type threshold values. A processing circuitry of the UE determines a random value and then selects a type of a random access procedure to be performed by the UE. The selecting comprises at least selecting one out of the plurality of random access type threshold values, comparing the determined random value against the selected random access type threshold value, and selecting a type of the random
(Continued)

access procedure based on the result of the comparison. The UE then performs the random access procedure of the selected type.

14 Claims, 8 Drawing Sheets

(51) Int. Cl.
  *H04W 74/02* (2009.01)
  *H04W 76/20* (2018.01)

(56) References Cited

U.S. PATENT DOCUMENTS

| | | | | |
|---|---|---|---|---|
| 2020/0314913 | A1* | 10/2020 | Rastegardoost | H04L 5/0091 |
| 2020/0351730 | A1* | 11/2020 | Park | H04W 36/0077 |
| 2022/0022269 | A1* | 1/2022 | Shi | H04W 74/0833 |
| 2022/0264638 | A1* | 8/2022 | Qiu | H04W 72/0446 |

OTHER PUBLICATIONS

3GPP, "3rd Generation Partnership Project; Technical Specification Group Radio Access Network; Study on new radio access technology: Radio access architecture and interfaces (Release 14)," 3GPP TR 38.801 V14.0.0, Mar. 2017, 91 pages.
3GPP, "$3^{rd}$ Generation Partnership Project; Technical Specification Group Services and System Aspects; Service requirements for the 5G system; Stage 1 (Release 16)," 3GPP TS 22.261 V16.8.0, Jun. 2019, 73 pages.
3GPP, "$3^{rd}$ Generation Partnership Project; Technical Specification Group Services and System Aspects; System Architecture for the 5G System; Stage 2 (Release 16)," 3GPP TS 23.501 V16.1.0, Jun. 2019, 368 pages.
3GPP, "3rd Generation Partnership Project; Technical Specification Group Core Network and Terminals; Non-Access-Stratum (NAS) protocol for 5G System (5GS); Stage 3 (Release 16)," 3GPP TS 24.501 V16.1.0, Jun. 2019, 541 pages.
3GPP, "$3^{rd}$ Generation Partnership Project; Technical Specification Group Radio Access Network; NR; Physical channels and modulation (Release 15)," 3GPP TS 38.211 V15.6.0, Jun. 2019, 97 pages.
3GPP, "$3^{rd}$ Generation Partnership Project; Technical Specification Group Radio Access Network; NR; NR and NG-RAN Overall Description; Stage 2 (Release 15)," 3GPP TS 38.300 V15.6.0, Jun. 2019, 99 pages.
3GPP, "$3^{rd}$ Generation Partnership Project; Technical Specification Group Radio Access Network; NR; User Equipment (UE) procedures in Idle mode and RRC Inactive state (Release 15)," 3GPP TS 38.304 V15.4.0, Jun. 2019, 29 pages.
3GPP, "$3^{rd}$ Generation Partnership Project; Technical Specification Group Radio Access Network; NR; Medium Access Control (MAC) protocol specification (Release 15)," 3GPP TS 38.321 V15.6.0, Jun. 2019, 78 pages.
3GPP, "3rd Generation Partnership Project; Technical Specification Group Radio Access Network; NR; Radio Resource Control (RRC) protocol specification (Release 15)," 3GPP TS 38.331 V15.6.0, Jun. 2019, 519 pages.
3GPP, "3rd Generation Partnership Project; Technical Specification Group Radio Access Network; Study on Scenarios and Requirements for Next Generation Access Technologies; (Release 15)," 3GPP TR 38.913 V15.0.0, Jun. 2018, 39 pages.
Extended European Search Report, dated Jan. 31, 2020, for European Application No. 19189391.6-1215, 6 pages.
International Search Report, mailed Sep. 8, 2020, for International Application No. PCT/EP2020/067106, 2 pages.

* cited by examiner

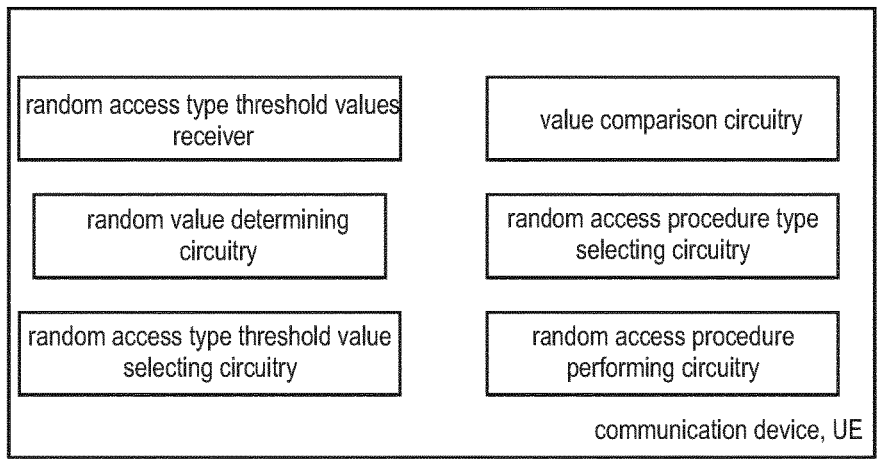
Fig. 10
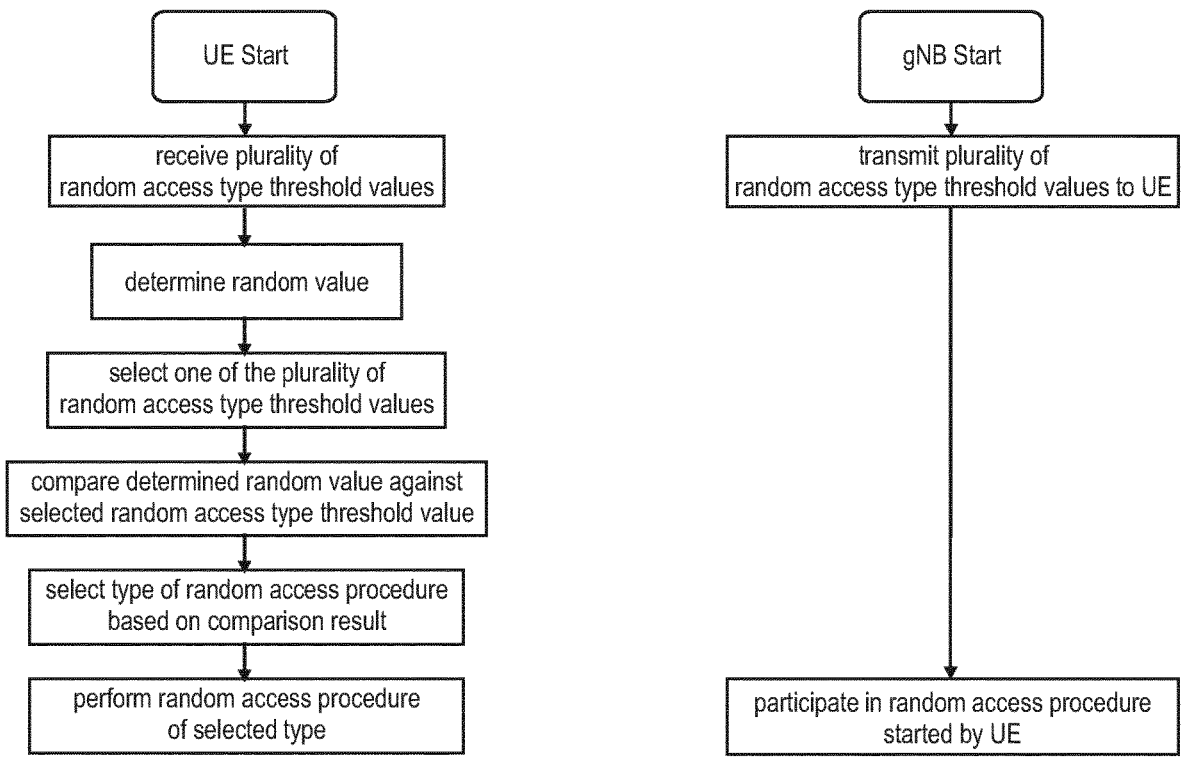
Fig. 11
Fig. 12

USER EQUIPMENT INVOLVED IN PERFORMING A RANDOM ACCESS PROCEDURE

BACKGROUND

Technical Field

The present disclosure is directed to methods, devices and articles in communication systems, such as 3GPP communication systems.

Description of the Related Art

Currently, the 3rd Generation Partnership Project (3GPP) works at the technical specifications for the next generation cellular technology, which is also called fifth generation (5G).

One objective is to provide a single technical framework addressing all usage scenarios, requirements and deployment scenarios (see, e.g., section 6 of TR 38.913 version 15.0.0), at least including enhanced mobile broadband (eMBB), ultra-reliable low-latency communications (URLLC), massive machine type communication (mMTC). For example, eMBB deployment scenarios may include indoor hotspot, dense urban, rural, urban macro and high speed; URLLC deployment scenarios may include industrial control systems, mobile health care (remote monitoring, diagnosis and treatment), real time control of vehicles, wide area monitoring and control systems for smart grids; mMTC deployment scenarios may include scenarios with large number of devices with non-time critical data transfers such as smart wearables and sensor networks. The services eMBB and URLLC are similar in that they both demand a very broad bandwidth, however are different in that the URLLC service may preferably require ultra-low latencies.

A second objective is to achieve forward compatibility. Backward compatibility to Long Term Evolution (LTE, LTE-A) cellular systems is not required, which facilitates a completely new system design and/or the introduction of novel features.

BRIEF SUMMARY

One non-limiting and exemplary embodiment facilitates providing procedures for facilitating to improve the random access procedure performed by a UE.

In an embodiment, the techniques disclosed here feature a user equipment comprising a receiver, which in operation, receives a plurality of random access type threshold values. The UE also comprises processing circuitry, which in operation, determines a random value. The processing circuitry selects a type of a random access procedure to be performed by the UE, wherein the selecting comprises at least selecting one out of the plurality of random access type threshold values, comparing the determined random value against the selected random access type threshold value, and selecting a type of the random access procedure based on the result of the comparison.

The UE then performs the random access procedure of the selected type.

It should be noted that general or specific embodiments may be implemented as a system, a method, an integrated circuit, a computer program, a storage medium, or any selective combination thereof.

Additional benefits and advantages of the disclosed embodiments and different implementations will be apparent from the specification and figures. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

In the following exemplary embodiments are described in more detail with reference to the attached figures and drawings.

FIG. 10 illustrates a structure of the UE according to an exemplary implementation of an improved random access procedure;

FIG. 11 is a flow diagram for the behavior of a UE, according to an exemplary implementation for an improved solution, FIG. 12 is a flow diagram for the behavior of a gNB, according to an exemplary implementation for an improved solution.

DETAILED DESCRIPTION

5G NR System Architecture and Protocol Stacks

3GPP has been working at the next release for the $5^{th}$ generation cellular technology, simply called 5G, including the development of a new radio access technology (NR) operating in frequencies ranging up to 100 GHz. The first version of the 5G standard was completed at the end of 2017, which allows proceeding to 5G NR standard-compliant trials and commercial deployments of smartphones.

Figure 1:
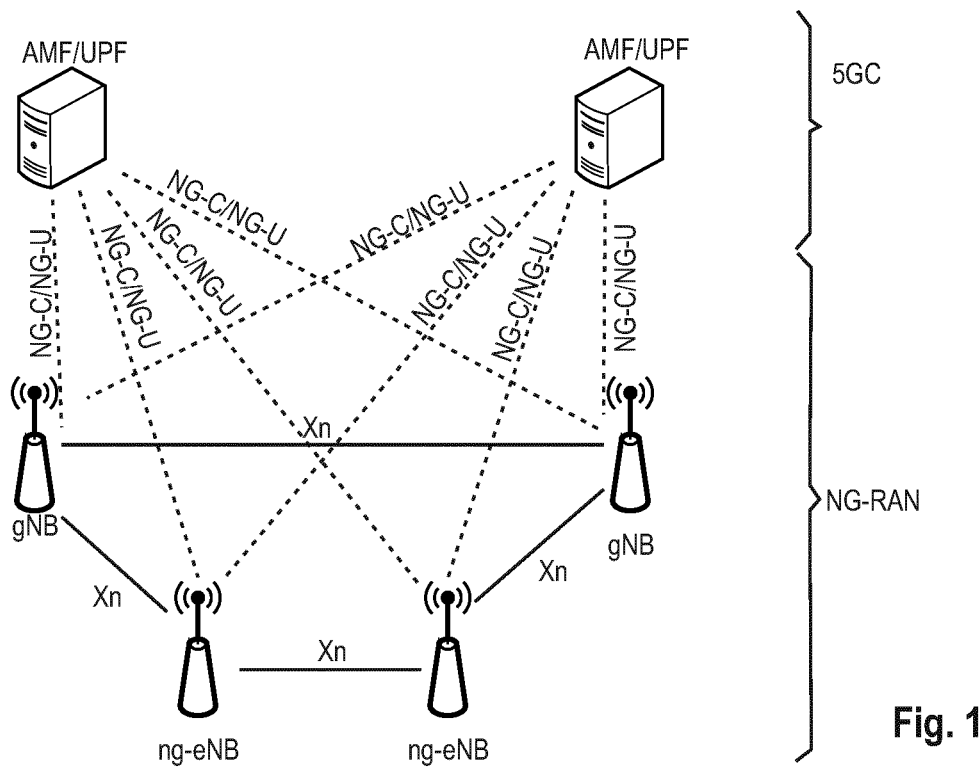
FIG. 1 shows an exemplary architecture for a 3GPP NR system.

Among other things, the overall system architecture assumes an NG-RAN (Next Generation-Radio Access Network) that comprises gNBs, providing the NG-radio access user plane (SDAP/PDCP/RLC/MAC/PHY) and control plane (RRC) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function) (e.g., a particular core entity performing the AMF) by means of the NG-C interface and to the UPF (User Plane Function) (e.g., a particular core entity performing the UPF) by means of the NG-U interface. The NG-RAN architecture is illustrated in FIG. 1 (see, e.g., 3GPP TS 38.300 v15.6.0, section 4).

Figure 2:
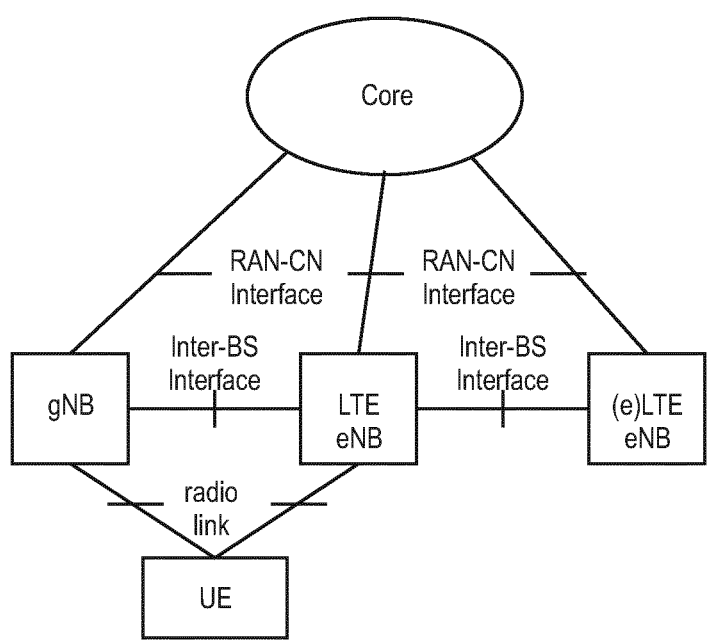
FIG. 2 shows an exemplary user and control plane architecture for the LTE eNB, gNB, and UE.

Various different deployment scenarios can be supported (see, e.g., 3GPP TR 38.801 v14.0.0). For instance, a non-centralized deployment scenario (see, e.g., section 5.2 of TR 38.801; a centralized deployment is illustrated in section 5.4) is presented therein, where base stations supporting the 5G NR can be deployed. FIG. 2 illustrates an exemplary non-centralized deployment scenario (see, e.g., FIG. 5.2.-1 of said TR 38.801), while additionally illustrating an LTE eNB as well as a user equipment (UE) that is connected to both a gNB and an LTE eNB. The new eNB for NR 5G may be exemplarily called gNB. An eLTE eNB is the evolution of an eNB that supports connectivity to the EPC (Evolved Packet Core) and the NGC (Next Generation Core).

The user plane protocol stack for NR (see, e.g., 3GPP TS 38.300, section 4.4.1) comprises the PDCP (Packet Data Convergence Protocol, see section 6.4 of TS 38.300), RLC (Radio Link Control, see section 6.3 of TS 38.300) and MAC (Medium Access Control, see section 6.2 of TS 38.300) sublayers, which are terminated in the gNB on the network side. Additionally, a new access stratum (AS) sublayer (SDAP, Service Data Adaptation Protocol) is introduced above PDCP (see, e.g., sub-clause 6.5 of 3GPP TS 38.300). A control plane protocol stack is also defined for NR (see for instance TS 38.300, section 4.4.2). An overview of the Layer 2 functions is given in sub-clause 6 of TS 38.300. The functions of the PDCP, RLC and MAC sublayers are listed respectively in sections 6.4, 6.3, and 6.2 of TS 38.300. The functions of the RRC layer are listed in sub-clause 7 of TS 38.300.

For instance, the Medium-Access-Control layer handles logical-channel multiplexing, and scheduling and scheduling-related functions, including handling of different numerologies.

The physical layer (PHY) is for example responsible for coding, PHY HARQ processing, modulation, multi-antenna processing, and mapping of the signal to the appropriate physical time-frequency resources. It also handles mapping of transport channels to physical channels. The physical layer provides services to the MAC layer in the form of transport channels. A physical channel corresponds to the set of time-frequency resources used for transmission of a particular transport channel, and each transport channel is mapped to a corresponding physical channel. One physical channel is the PRACH (Physical Random Access Channel) used for the random access.

Use cases/deployment scenarios for NR could include enhanced mobile broadband (eMBB), ultra-reliable low-latency communications (URLLC), massive machine type communication (mMTC), which have diverse requirements in terms of data rates, latency, and coverage. For example, eMBB is expected to support peak data rates (20 Gbps for downlink and 10 Gbps for uplink) and user-experienced data rates in the order of three times what is offered by IMT-Advanced. On the other hand, in case of URLLC, the tighter requirements are put on ultra-low latency (0.5 ms for UL and DL each for user plane latency) and high reliability (1-10$^{-5}$ within 1 ms). Finally, mMTC may preferably require high connection density (1,000,000 devices/km$^2$ in an urban environment), large coverage in harsh environments, and extremely long-life battery for low cost devices (15 years).

Therefore, the OFDM numerology (e.g., subcarrier spacing, OFDM symbol duration, cyclic prefix (CP) duration, number of symbols per scheduling interval) that is suitable for one use case might not work well for another. For example, low-latency services may preferably require a shorter symbol duration (and thus larger subcarrier spacing) and/or fewer symbols per scheduling interval (aka, TTI) than an mMTC service. Furthermore, deployment scenarios with large channel delay spreads may preferably require a longer CP duration than scenarios with short delay spreads. The subcarrier spacing should be optimized accordingly to retain the similar CP overhead. NR may support more than one value of subcarrier spacing. Correspondingly, subcarrier spacing of 15 kHz, 30 kHz, 60 kHz . . . are being considered at the moment. The symbol duration $T_u$ and the subcarrier spacing $\Delta f$ are directly related through the formula $\Delta f = 1/T_u$. In a similar manner as in LTE systems, the term "resource element" can be used to denote a minimum resource unit being composed of one subcarrier for the length of one OFDM/SC-FDMA symbol.

In the new radio system 5G-NR for each numerology and carrier a resource grid of subcarriers and OFDM symbols is defined respectively for uplink and downlink. Each element in the resource grid is called a resource element and is identified based on the frequency index in the frequency domain and the symbol position in the time domain (see 3GPP TS 38.211 v15.6.0).

5G NR Functional Split Between NG-RAN and 5GC

Figure 3:
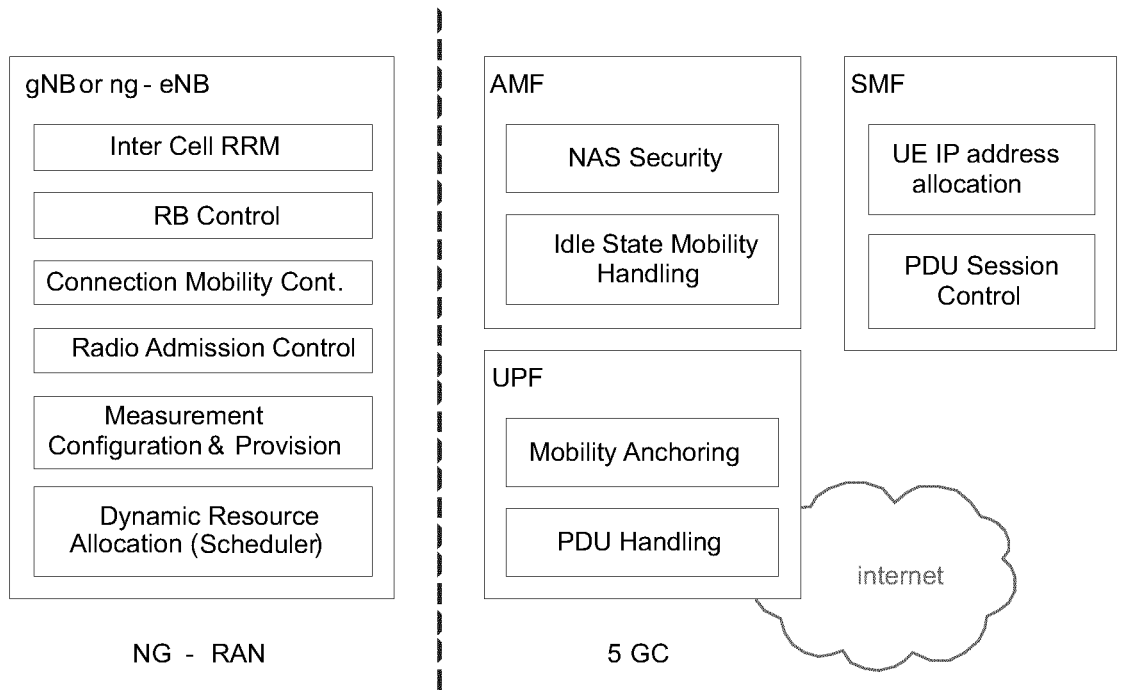
FIG. 3 is a schematic drawing which shows a functional split between NG-RAN and 5GC.

FIG. 3 illustrates functional split between NG-RAN and 5GC. NG-RAN logical node is a gNB or ng-eNB. The 5GC has logical nodes AMF, UPF and SMF.

In particular, the gNB and ng-eNB host the following main functions:

Functions for Radio Resource Management such as Radio Bearer Control, Radio Admission Control, Connection Mobility Control, Dynamic allocation of resources to UEs in both uplink and downlink (scheduling);

IP header compression, encryption and integrity protection of data;

Selection of an AMF at UE attachment when no routing to an AMF can be determined from the information provided by the UE;

Routing of User Plane data towards UPF(s);

Routing of Control Plane information towards AMF;

Connection setup and release;

Scheduling and transmission of paging messages;

Scheduling and transmission of system broadcast information (originated from the AMF or OAM);

Measurement and measurement reporting configuration for mobility and scheduling;

Transport level packet marking in the uplink;

Session Management;

Support of Network Slicing;

QoS Flow management and mapping to data radio bearers;

Support of UEs in RRC_INACTIVE state;

Distribution function for NAS messages;

Radio access network sharing;

Dual Connectivity;

Tight interworking between NR and E-UTRA.

The Access and Mobility Management Function (AMF) hosts the following main functions:
- Non-Access Stratum, NAS, signaling termination;
- NAS signaling security;
- Access Stratum, AS, Security control;
- Inter Core Network, CN, node signaling for mobility between 3GPP access networks;
- Idle mode UE Reachability (including control and execution of paging retransmission);
- Registration Area management;
- Support of intra-system and inter-system mobility;
- Access Authentication;
- Access Authorization including check of roaming rights;
- Mobility management control (subscription and policies);
- Support of Network Slicing;
- Session Management Function, SMF, selection.

Furthermore, the User Plane Function, UPF, hosts the following main functions:
- Anchor point for Intra-/Inter-RAT mobility (when applicable);
- External PDU session point of interconnect to Data Network;
- Packet routing & forwarding;
- Packet inspection and User plane part of Policy rule enforcement;
- Traffic usage reporting;
- Uplink classifier to support routing traffic flows to a data network;
- Branching point to support multi-homed PDU session;
- QoS handling for user plane, e.g., packet filtering, gating, UL/DL rate enforcement;
- Uplink Traffic verification (SDF to QoS flow mapping);
- Downlink packet buffering and downlink data notification triggering.

Finally, the Session Management function, SMF, hosts the following main functions.
- Session Management;
- UE IP address allocation and management;
- Selection and control of UP function;
- Configures traffic steering at User Plane Function, UPF, to route traffic to proper destination;
- Control part of policy enforcement and QoS;
- Downlink Data Notification.

RRC Connection Setup and Reconfiguration Procedures

Figure 4:
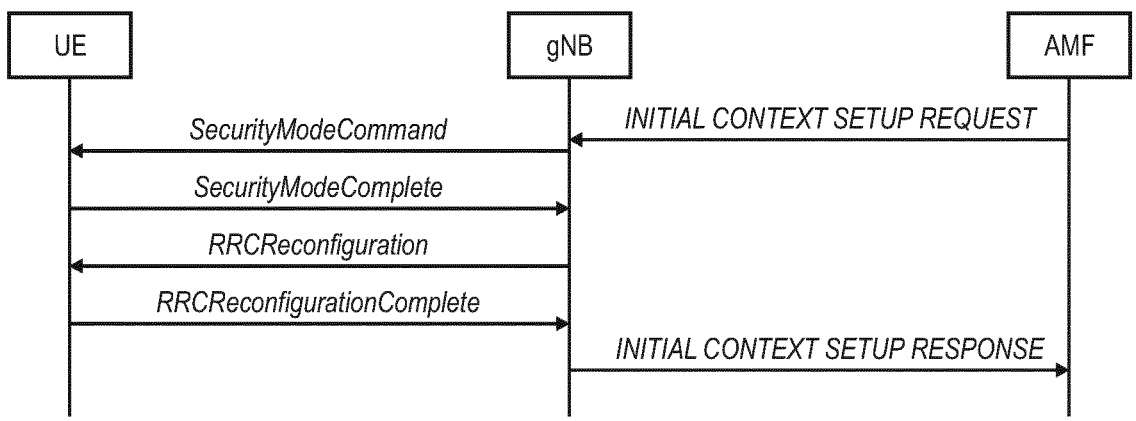
FIG. 4 is a sequence diagram for RRC connection setup/reconfiguration procedures.

FIG. 4 illustrates some interactions between a UE, gNB, and AMF (an 5GC entity) in the context of a transition of the UE from RRC_IDLE to RRC_CONNECTED for the NAS part (see TS 38.300 v15.6.0).

RRC is a higher layer signaling (protocol) used for UE and gNB configuration. In particular, this transition involves that the AMF prepares the UE context data (including, e.g., PDU session context, the Security Key, UE Radio Capability and UE Security Capabilities, etc.) and sends it to the gNB with the INITIAL CONTEXT SETUP REQUEST. Then, the gNB activates the AS security with the UE, which is performed by the gNB transmitting to the UE a SecurityModeCommand message and by the UE responding to the gNB with the SecurityModeComplete message. Afterwards, the gNB performs the reconfiguration to setup the Signaling Radio Bearer 2, SRB2, and Data Radio Bearer(s), DRB(s) by means of transmitting to the UE the RRCReconfiguration message and, in response, receiving by the gNB the RRCReconfigurationComplete from the UE. For a signaling-only connection, the steps relating to the RRCReconfiguration are skipped since SRB2 and DRBs are not setup. Finally, the gNB informs the AMF that the setup procedure is completed with the INITIAL CONTEXT SETUP RESPONSE.

In the present disclosure, thus, an entity (for example AMF, SMF, etc.) of a 5th Generation Core (5GC) is provided that comprises control circuitry which, in operation, establishes a Next Generation (NG) connection with a gNodeB, and a transmitter which, in operation, transmits an initial context setup message, via the NG connection, to the gNodeB to cause a signaling radio bearer setup between the gNodeB and a user equipment (UE). In particular, the gNodeB transmits a Radio Resource Control, RRC, signaling containing a resource allocation configuration information element to the UE via the signaling radio bearer. The UE then performs an uplink transmission or a downlink reception based on the resource allocation configuration.

Usage Scenarios of IMT for 2020 and Beyond

Figure 5:
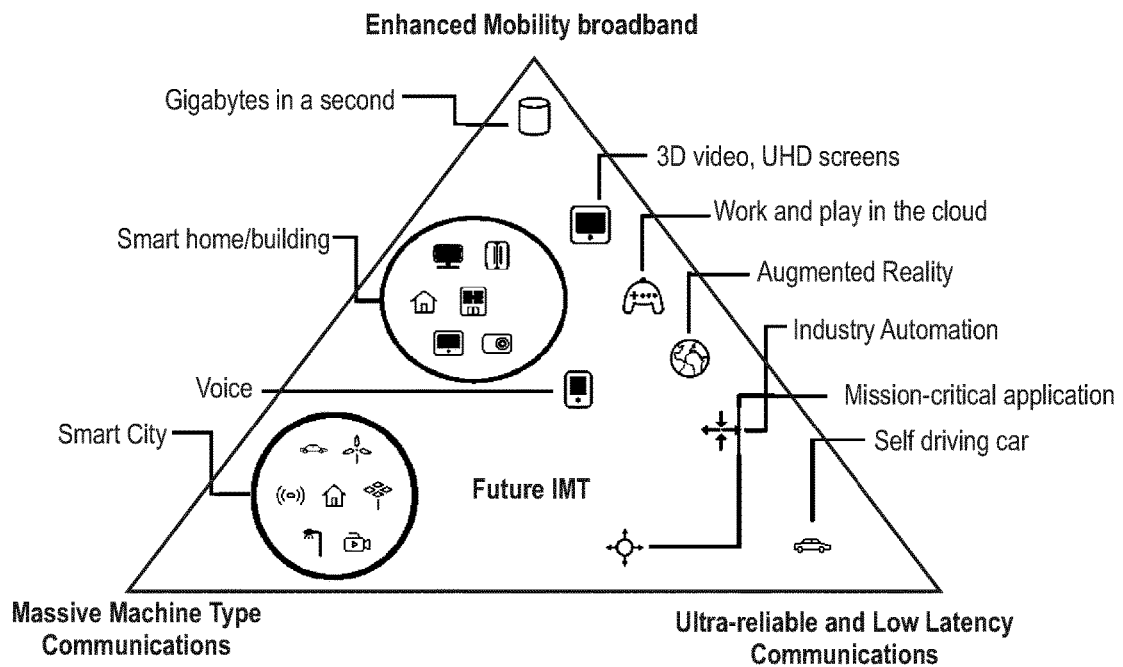
FIG. 5 is a schematic drawing showing usage scenarios of Enhanced mobile broadband (eMBB), Massive Machine Type Communications (mMTC) and Ultra Reliable and Low Latency Communications (URLLC)

FIG. 5 illustrates some of the use cases for 5G NR. In 3rd generation partnership project new radio (3GPP NR), three use cases are being considered that have been envisaged to support a wide variety of services and applications by IMT-2020. The specification for the phase 1 of enhanced mobile-broadband (eMBB) has been concluded. In addition to further extending the eMBB support, the current and future work would involve the standardization for ultra-reliable and low-latency communications (URLLC) and massive machine-type communications. FIG. 5 illustrates some examples of envisioned usage scenarios for IMT for 2020 and beyond.

The URLLC use case has stringent requirements for capabilities such as throughput, latency and availability and has been envisioned as one of the enablers for future vertical applications such as wireless control of industrial manufacturing or production processes, remote medical surgery, distribution automation in a smart grid, transportation safety, etc. Ultra-reliability for URLLC is to be supported by identifying the techniques to meet the requirements set by TR 38.913. For NR URLLC in Release 15, key requirements include a target user plane latency of 0.5 ms for UL (uplink) and 0.5 ms for DL (downlink). The general URLLC requirement for one transmission of a packet is a BLER (block error rate) of 1E-5 for a packet size of 32 bytes with a user plane latency of 1 ms.

From RAN1 perspective, reliability can be improved in a number of possible ways. The current scope for improving the reliability involves defining separate CQI tables for URLLC, more compact DCI formats, repetition of PDCCH, etc. However, the scope may widen for achieving ultra-reliability as the NR becomes more stable and developed (for NR URLLC key requirements). Particular use cases of NR URLCC in Rel. 15 include Augmented Reality/Virtual Reality (AR/VR), e-health, e-safety, and mission-critical applications.

Moreover, technology enhancements targeted by NR URLCC aim at latency improvement and reliability improvement. Technology enhancements for latency improvement include configurable numerology, non slot-based scheduling with flexible mapping, grant free (configured grant) uplink, slot-level repetition for data channels, and downlink pre-emption. Pre-emption means that a transmission for which resources have already been allocated is stopped, and the already allocated resources are used for another transmission that has been requested later, but has lower latency/higher priority requirements. Accordingly, the already granted transmission is pre-empted by a later transmission. Pre-emption is applicable independent of the particular service type. For example, a transmission for a service-type A (URLCC) may be pre-empted by a transmission for a service type B (such as eMBB). Technology enhancements with respect to reliability improvement include dedicated CQI/MCS tables for the target BLER of 1E-5.

The use case of mMTC (massive machine type communication) is characterized by a very large number of connected devices typically transmitting a relatively low volume of non-delay sensitive data. Devices are required to be low cost and to have a very long battery life. From NR perspective, utilizing very narrow bandwidth parts is one possible solution to have power saving from UE perspective and enable long battery life.

As mentioned above, it is expected that the scope of reliability in NR becomes wider. One key requirement to all the cases, and especially necessary for URLLC and mMTC, is high reliability or ultra-reliability. Several mechanisms can be considered to improve the reliability from radio perspective and network perspective. In general, there are a few key potential areas that can help improve the reliability. Among these areas are compact control channel information, data/control channel repetition, and diversity with respect to frequency, time and/or the spatial domain. These areas are applicable to reliability in general, regardless of particular communication scenarios.

For NR URLLC, further use cases with tighter requirements have been identified such as factory automation, transport industry and electrical power distribution, including factory automation, transport industry, and electrical power distribution. The tighter requirements are higher reliability (up to 10-6 level), higher availability, packet sizes of up to 256 bytes, time synchronization down to the order of a few μs where the value can be one or a few μs depending on frequency range and short latency in the order of 0.5 to 1 ms in particular a target user plane latency of 0.5 ms, depending on the use cases.

Moreover, for NR URLLC, several technology enhancements from RAN1 perspective have been identified. Among these are PDCCH (Physical Downlink Control Channel) enhancements related to compact DCI, PDCCH repetition, increased PDCCH monitoring. Moreover, UCI (Uplink Control Information) enhancements are related to enhanced HARQ (Hybrid Automatic Repeat Request) and CSI feedback enhancements. Also PUSCH enhancements related to mini-slot level hopping and retransmission/repetition enhancements have been identified. The term "mini-slot" refers to a Transmission Time Interval (TTI) including a smaller number of symbols than a slot (a slot comprising fourteen symbols).

QoS Control

The 5G QoS (Quality of Service) model is based on QoS flows and supports both QoS flows that require guaranteed flow bit rate (GBR QoS flows) and QoS flows that do not require guaranteed flow bit rate (non-GBR QoS Flows). At NAS level, the QoS flow is thus the finest granularity of QoS differentiation in a PDU session. A QoS flow is identified within a PDU session by a QoS flow ID (QFI) carried in an encapsulation header over NG-U interface.

For each UE, 5GC establishes one or more PDU Sessions. For each UE, the NG-RAN establishes at least one Data Radio Bearers (DRB) together with the PDU Session, and additional DRB(s) for QoS flow(s) of that PDU session can be subsequently configured (it is up to NG-RAN when to do so), e.g., as shown above with reference to FIG. 4. The NG-RAN maps packets belonging to different PDU sessions to different DRBs. NAS level packet filters in the UE and in the 5GC associate UL and DL packets with QoS Flows, whereas AS-level mapping rules in the UE and in the NG-RAN associate UL and DL QoS Flows with DRBs.

Figure 6:
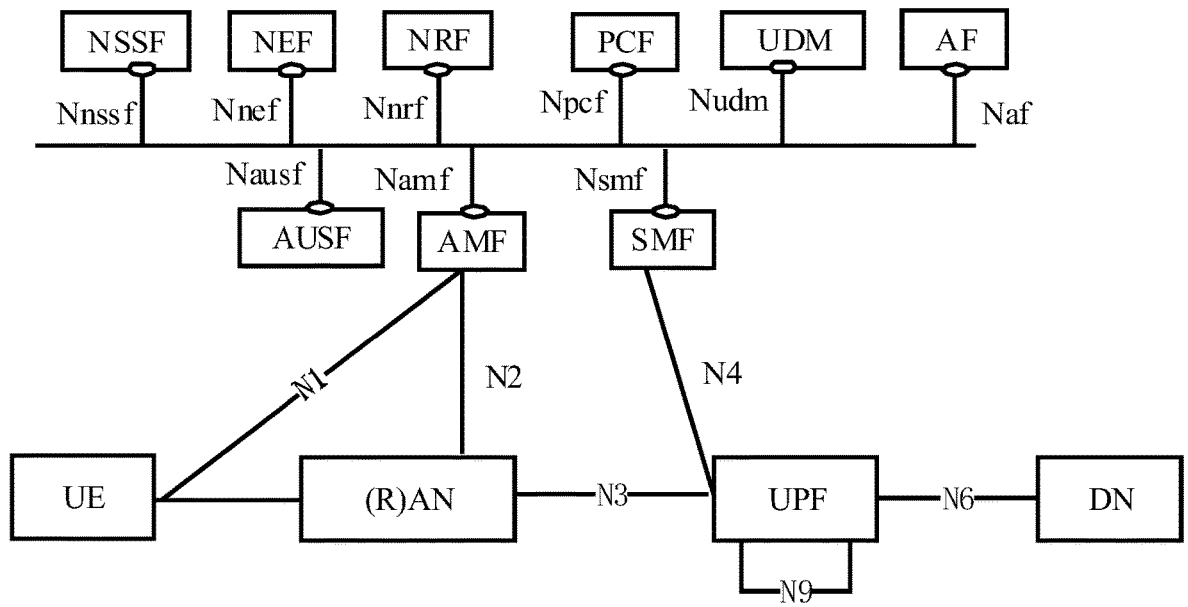
FIG. 6 is a block diagram showing an exemplary 5G system architecture for a non-roaming scenario.

FIG. 6 illustrates a 5G NR non-roaming reference architecture (see TS 23.501 v16.1.0, section 4.23). An Application Function (AF), e.g., an external application server hosting 5G services, exemplarily described in FIG. 5, interacts with the 3GPP Core Network in order to provide services, for example to support application influence on traffic routing, accessing Network Exposure Function (NEF) or interacting with the Policy framework for policy control (see Policy Control Function, PCF), e.g., QoS control. Based on operator deployment, Application Functions considered to be trusted by the operator can be allowed to interact directly with relevant Network Functions. Application Functions not allowed by the operator to access directly the Network Functions use the external exposure framework via the NEF to interact with relevant Network Functions.

FIG. 6 shows further functional units of the 5G architecture, namely Network Slice Selection Function (NSSF), Network Repository Function (NRF), Unified Data Management (UDM), Authentication Server Function (AUSF), Access and Mobility Management Function (AMF), Session Management Function (SMF), and Data Network (DN), e.g., operator services, Internet access or 3rd party services.

Unified Access Control (UAC)

In the exemplary 5G scenarios, different criterion can be used in determining which access attempt should be allowed or blocked, e.g., depending on operator policies, deployment scenarios, subscriber profiles, and available services (see 3GPP TS 22.261 v16.8.0 section 6.22, 3GPP TS 24.501 v16.1.0 section 4.5). These different criteria for access control can be associated with Access Identities and Access Categories. The 5G system currently provides a single unified access control where operators control accesses based on these two criterions.

In unified access control, each access attempt is categorized into one or more of the Access Identities and one of the Access Categories. Based on the access control information applicable for the corresponding Access Identity and Access Category of the access attempt, the UE performs a test whether the actual access attempt can be made or not.

The unified access control supports extensibility to allow inclusion of additional standardized Access Identities and Access Categories and supports flexibility to allow operators to define operator-defined Access Categories using their own criterion (e.g., network slicing, application, and application server).

The following table gives an overview of the different Access Identities that could be defined in 3GPP.

| Access Identity number | UE configuration |
|---|---|
| 0 | UE is not configured with any parameters from this table |
| 1 (NOTE 1) | UE is configured for Multimedia Priority Service (MPS). |
| 2 (NOTE 2) | UE is configured for Mission Critical Service (MCS). |
| 3-10 | Reserved for future use |
| 11 (NOTE 3) | Access Class 11 is configured in the UE. |
| 12 (NOTE 3) | Access Class 12 is configured in the UE. |
| 13 (NOTE 3) | Access Class 13 is configured in the UE. |

-continued

| Access Identity number | UE configuration |
|---|---|
| 14 (NOTE 3) | Access Class 14 is configured in the UE. |
| 15 (NOTE 3) | Access Class 15 is configured in the UE. |

NOTE 1:
Access Identity 1 is used by UEs configured for MPS, in the PLMNs where the configuration is valid. The PLMNs where the configuration is valid are HPLMN, PLMNs equivalent to HPLMN, and visited PLMNs of the home country. Access Identity 1 is also valid when the UE is explicitly authorized by the network based on specific configured PLMNs inside and outside the home country.
NOTE 2:
Access Identity 2 is used by UEs configured for MCS, in the PLMNs where the configuration is valid. The PLMNs where the configuration is valid are HPLMN or PLMNs equivalent to HPLMN and visited PLMNs of the home country. Access Identity 2 is also valid when the UE is explicitly authorized by the network based on specific configured PLMNs inside and outside the home country.
NOTE 3:
Access Identities 11 and 15 are valid in Home PLMN only if the EHPLMN list is not present or in any EHPLMN. Access Identities 12, 13 and 14 are valid in Home PLMN and visited PLMNs of home country only. For this purpose, the home country is defined as the country of the MCC part of the IMSI.

The following table gives an overview of the different Access Categories that could be defined in 3GPP.

| Access Category number | Conditions related to UE | Type of access attempt |
|---|---|---|
| 0 | All | MO (Mobile Originated) signaling resulting from paging |
| 1 (NOTE 1) | UE is configured for delay tolerant service and subject to access control for Access Category 1, which is judged based on relation of UE's HPLMN and the selected PLMN. | All except for Emergency |
| 2 | All | Emergency |
| 3 | All except for the conditions in Access Category 1. | MO signaling on NAS level resulting from other than paging |
| 4 | All except for the conditions in Access Category 1. | MMTEL voice (NOTE 3) |
| 5 | All except for the conditions in Access Category 1. | MMTEL video |
| 6 | All except for the conditions in Access Category 1. | SMS |
| 7 | All except for the conditions in Access Category 1. | MO data that do not belong to any other Access Categories (NOTE 4) |
| 8 | All except for the conditions in Access Category 1 | MO signaling on RRC level resulting from other than paging |
| 9-31 | | Reserved standardized Access Categories |
| 32-63 (NOTE 2) | All | Based on operator classification |

NOTE 1:
The barring parameter for Access Category 1 is accompanied with information that define whether Access Category applies to UEs within one of the following categories:
a) UEs that are configured for delay tolerant service;
b) UEs that are configured for delay tolerant service and are neither in their HPLMN nor in a PLMN that is equivalent to it;
c) UEs that are configured for delay tolerant service and are neither in the PLMN listed as most preferred PLMN of the country where the UE is roaming in the operator-defined PLMN selector list on the SIM/USIM, nor in their HPLMN nor in a PLMN that is equivalent to their HPLMN.
When a UE is configured for EAB, the UE is also configured for delay tolerant service. In case a UE is configured both for EAB and for EAB override, when upper layer indicates to override Access Category 1, then Access Category 1 is not applicable.
NOTE 2:
When there are an Access Category based on operator classification and a standardized Access Category to both of which an access attempt can be categorized, and the standardized Access Category is neither 0 nor 2, the UE applies the Access Category based on operator classification. When there are an Access Category based on operator classification and a standardized Access Category to both of which an access attempt can be categorized, and the standardized Access Category is 0 or 2, the UE applies the standardized Access Category.
NOTE 3:
Includes Real-Time Text (RTT).
NOTE 4:
Includes IMS Messaging.

As apparent from the above table, Access Category 0 shall not be barred, irrespective of Access Identities.

Based on operator's policy, the 5G system shall be able to prevent UEs from accessing the network using relevant barring parameters that vary depending on the Access Identity and Access Category. Access Identities are configured at the UE as listed in the above table. Access Categories are defined by the combination of conditions related to UE and the type of access attempt as listed in the above table. One or more Access Identities and only one Access Category are selected and tested for an access attempt.

The 5G network shall be able to broadcast barring control information (i.e., a list of barring parameters associated with an Access Identity and an Access Category) in one or more areas of the RAN.

The UE shall be able to determine whether or not a particular new access attempt is allowed based on barring parameters that the UE receives from the broadcast barring control information and the configuration in the UE. The unified access control framework can be applicable to UEs in RRC Idle, RRC Inactive, and RRC Connected at the time of initiating a new access attempt (e.g., new session request).

In particular, the purpose of the UAC procedure is to perform an access barring check for an access attempt associated with a given Access Category and one or more Access Identities, e.g., upon request from upper layers.

The Access control check is performed for access attempts of particular events, e.g., as defined in 3GPP TS 24.501 v16.1.0 section 4.5.1. When the UE wants to initiate an access attempt in one of these events, the UE can determine one or more access identities from the standardized access identities (see above table), and one access category from the set of standardized access categories and possibly operator-defined access categories (see, e.g., TS 24.501, section 4.5.3), to be associated with that access attempt.

In one exemplary 3GPP implementation, the following steps are performed by the UE in relation to the unified access control (UAC) procedure (see 3GPP TS 38.331 v15.6.0 section 5.3.14.5):

The UE shall:

1> it: one or more Access identities are indicated according to TS 24.501, and
1> if for at least one of these Access Identities the corresponding bit in the uac-BarringForAccessIdentity contained in "UAC barring parameter" is set to zero:
2> consider the access attempt as allowed;
1> else:
2> draw a random number 'rand' uniformly distributed in the range: 0 ≤ rand <1;
2> if 'rand' is lower than the -value indicated by uac-BarringFactor included "UAC barring parameter":
3> consider the access attempt as allowed;
2>else.:
3> consider the access attempt as barred;
1> if the access attempt is considered as barred:
2> draw a random. number 'rand' that is uniformly distributed in the range 0 d _rand <1;
2>start timer T390 for the Access Category with the timer value calculated as follows, using the uac-Barringfrme included in "AC barring parameter":
T390 = (0.7+0.6 , * rand) * uac-BarringTime.

Some parameters for the UAC procedure are provided to the UE via System Information, e.g., in the SIB1 (e.g., SIB1, see 3GPP TS 38.331 v15.6.0 section 6.2.2).

SIB1 contains information relevant when evaluating if a UE is allowed to access a cell and defines the scheduling of other system information. It also contains radio resource configuration information that is common for all UEs and barring information applied to the unified access control.

Signaling radio bearer: N/A
RLC-SAP: TM
Logical channels: BCCH
Direction: Network to UE
SIB1 Message

```
-- ASN1START
-- TAG-SIB1-START
SIB1 ::=                                    SEQUENCE {
    cellSelectionInfo                           SEQUENCE {
        q-RxLevMin                                  Q-RxLevMin,
        q-RxLevMinOffset                            INTEGER (1..8)   OPTIONAL, -- Need S
        q-RxLevklinSUL                              Q-RxLevMin  OPTIONAL, -- Need R
        q-QualMin                                   Q-QualMin  OPTIONAL, -- Need S
        q-QualMinOffset                             INTEGER (1..8)  OPTIONAL -- Need S
    }                                           OPTIONAL, -- Cond Standalone
    cellAccessRelatedInfo                       CellAccessRelatedInfo,
    connEstFailureControl                       ConnEstFailureControl   OPTIONAL, -- Need R
    si-SchedulingInfo                           SI-SchedulingInfo   OPTIONAL, -- Need R
    servingCellConfigCommon                     ServingCellConfigCommonSIB   OPTIONAL, -- Need R
    ims-ErnergeneySuppod                            ENUMERATED {true}   OPTIONAL, -- Need R
    eCallOverIMS-Support                        ENUMERATED {true}   OPTIONAL, -- Cond Absent
    ue-TimersAndConstants                       UE-TimersAndConstants   OPTIONAL, -- Need R
    uac-BarringInfo                             SEQUENCE {
        uac-BarringForCommon                        UAC-BarringPerCatList   OPTIONAL, -- Need S
        oac-BarringPerPLMN-List                     UAC-BarringPerPLMN-List   OPTIONAL, -- Need S
        uac-BarringInfoSetList                      UAC-BarringInfoSetList,
        uac-AccessCategory1-SeleetionAssistanceInfo CHOICE {
            pimnCommon                                  UAC-AccessCategory1-SelectionAssistanceInfo,
            individualPLMNList                          SEQUENCE (SIZE (2..maxPLMN)) OF UAC-AccessCategory1-
SelectionAssistanceInfo
        }                                           OPTIONAL -- Need S
    }                                           OPTIONAL, -- Need R
    useFullResumeID                             ENUMERATED {true}   OPTIONAL, -- Need N
    lateNonCriticalExtension                    OCTET STRING  OPTIONAL,
    nonCriticalExtension                        SEQUENCE{}  OPTIONAL
}
UAC-Accesseategory1-SelectionAssistanceInfo ::=    ENUMERATED {a, b, c}
-- TAG-SIB1-STOP
-- ASN1STOP
```

| SIB1 field descriptions |
| --- |
| cellSelectionInfo |
| Parameters for cell selection related to the serving cell. |
| ims-EmergencySupport |
| Indicates whether the cell supports IMS emergency bearer services for UEs in limited service mode. If absent, IMS emergency call is not supported by the network in the cell for UEs in limited service mode. |
| q-QualMin |
| Parameter "$Q_{qualmin}$" in TS 38.304 [20], applicable for serving cell. If the field is absent, the UE applies the (default) value of negative infinity for $Q_{qualmin}$. |

| SIB1 field descriptions |
|---|
| q-QualMinOffset |
| Parameter "$Q_{qualminoffset}$" in TS 38.304 [20]. Actual value $Q_{qualminoffset}$ = field value [dB]. If the field is absent, the UE applies the (default) value of 0 dB for $Q_{qualminoffset}$. Affects the minimum required quality level in the cell. |
| q-RxLevMin |
| Parameter "$Q_{rxlevmin}$" in TS 38.304 [20], applicable for serving cell. |
| q-RxLevMinOffset |
| Parameter "$Q_{rxlevminoffset}$" in TS 38.304 [20]. Actual value $Q_{rxlevminoffset}$ = field value * 2 [dB]. If absent, the UE applies the (default) value of 0 dB for $Q_{rxlevminoffset}$. Affects the minimum required Rx level in the cell. |
| q-RxLevMinSUL |
| Parameter "$Q_{rxlevmin}$" in TS 38.304 [20], applicable for serving cell. |
| servingCellConfigCommon |
| Configuration of the serving cell, |
| uac-AccessCategory1-SelectionAssistanceInfo |
| Information used to determine whether Access Category 1 applies to the UE, as defined in TS 22.261 [25]. |
| uac-BarringForCommon |
| Common access control parameters for each access category. Common values are used for all PLMNs, unless overwritten by the PLMN specific configuration provided in uac-BarringPerPLMN-List. The parameters are specified by providing an index to the set of configurations (uac-BarringInfoSetList). UE behavior upon absence of this field is specified in clause 5.3.14.2. |
| ue-TimersAndConstants |
| Timer and constant values to be used by the UE. |
| useFullResumeID |
| Indicates which resume identifier and Resume request message should be used. UE uses fullI-RNTI and RRCResumeRequest1 if the field is present, or shortI-RNTI and RRCResumeRequest if the field is absent. |

| Conditional Presence | Explanation |
|---|---|
| Absent | The field is not used in this version of the specification if received the UE shall ignore. |
| Standalone | The field is mandatory present in a cell that supports standalone operation, otherwise it is absent. |

The parameter UAC-BarringInfoSetList of SIB1 can be defined as follows and carries the parameter UAC-BarringFactor mentioned above in the UAC procedure.
UAC-BarringInfoSetList The IE UAC-BarringInfoSetList provides a list of access control parameter sets. An access category can be configured with access parameters according to one of the sets.
UAC-BarringInfoSetList Information Element

```
-- ASN1START
-- TAG-UAC-BARRINGINFOSETLIST-START
UAC-BarringInfoSetList ::=      SEQUENCE {SIZE(1..maxBarringInfoSet) ) OF
                                    UAC-
                                    BarringInfoSet
UAC-BarringInfoSet ::=          SEQUENCE {
uac-BarringFactor               ENUMERATED {p00, p05, p10, p15, p20, p25,
                                    p30, p40, p50, p60, p70, p75,
                                    p80, p85, p90, p95} ,
uac-BarringTime                 ENUMERATED {s4, s8, s16, s32, s64, s128,
                                    s256, s512},
uac-BarringForAccessIdentity    BIT STRING (SIZE (7) )
}
-- TAG-UAC-BARRINGINFOSETLIST-STOP
-- ASN1STOP
```

| UAC-BarringInfoSetList field descriptions |
|---|
| uac-BarringInfoSetList |
| List of access control parameter sets. Each access category can be configured with access parameters corresponding to a particular set by uac-barringInfoSetIndex. Association of an access category with an index that has no corresponding entry in the uac-BarringInfoSetList is valid configuration and indicates no barring, |
| uac-BarringForAccessIdentity |
| Indicates whether access attempt is allowed for each Access Identity. The leftmost bit, bit 0 in the bit string corresponds to Access Identity 1, bit 1 in the bit string corresponds to Access Identity 2, bit 2 in the bit string corresponds to Access Identity 11, bit 3 in the bit string corresponds to Access Identity 12, bit 4 in the bit string corresponds to Access Identity 13, bit 5 in the bit string corresponds to Access Identity 14, and bit 6 in the bit string corresponds to Access Identity 15. Value 0 means that access attempt is allowed for the corresponding access identity. |
| uac-BarringFactor |
| Represents the probability that access attempt would be allowed during access barring check. |
| uac-BarringFactor |
| The minimum time in seconds before a new access attempt is to be performed after an access attempt was barred at access barring check for the same access category. |

The above UAC procedure can be summarized as follows. It is assumed that an access attempt can be associated to one Access Category and one or more Access identities. The UE first checks whether the access attempt is allowed based on the associated Access Identities and the configured Access Identities broadcast by system information (e.g., SIB1, see 3GPP TS 38.331 v15.6.0 section 6.2.2). Then, if the UE determines, based on the access identity(ies), it is allowed to perform an access attempt with the cell, the UE then proceeds to perform the access attempt. On the other hand, if the UE determines, based on the access identity(ies), that it is not allowed to perform an access attempt with the cell, the UE then proceeds to determine whether an access attempt is allowed based on the access category. This, for instance, involves drawing a random value and comparing same with a particular probability threshold for the access-category-based access attempt (uac-BarringFactor associated with that access category; information is known to the UE, e.g., by system information). If the random value is less than the access attempt probability threshold, then the UE is allowed to access the cell. But, if the random value is equal to or larger than the access attempt probability threshold, the UE is not allowed to access the cell.

One important further procedure performed at the UE that is closely related to the Unified Access Control is the random access procedure (also termed RACH procedure). UAC allows the UE to test whether the UE should perform an access attempt with a particular gNB. Once the UE positively decides to perform an access attempt, the UE may for instance perform a random access procedure to access the radio cell; put differently, an access attempt involves performing a random access procedure.

As will be described in the following, a random access procedure can be performed for many different reasons. From the perspective of the RACH procedure, performing a random access procedure may or may not always be preceded by the UE performing a UAC check as described above.

Random Access Procedure

Similar to LTE, 5G NR provides a RACH (Random Access Channel) procedure (or simply random access procedure). For instance, the RACH procedure can be used by the UE to access a cell it has found. The RACH procedure can also be used in other contexts within NR, for example:

For handover, when synchronization is to be established to a new cell;
To reestablish uplink synchronization to the current cell if synchronization has been lost due to a too long period without any uplink transmission from the device;
To request uplink scheduling if no dedicated scheduling request resource has been configured for the device.

There are numerous events that may trigger the UE to perform a random access procedure such as (see 3GPP TS 38.300, v15.6.0 section 9.2.6):

Initial access from RRC_IDLE;
RRC Connection Re-establishment procedure;
DL or UL data arrival during RRC_CONNECTED when UL synchronization status is "non-synchronized";
UL data arrival during RRC_CONNECTED when there are no PUCCH resources for SR available;
SR failure;
Request by RRC upon synchronous reconfiguration (e.g., handover);
Transition from RRC_INACTIVE;
To establish time alignment at SCell addition;
Request for Other SI (see subclause 7.3);
Beam failure recovery.

Figure 7:
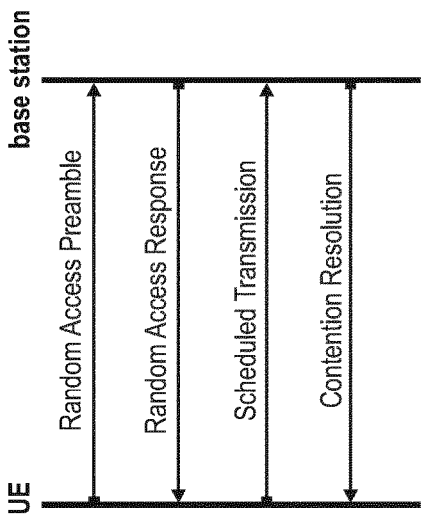
FIG. 7 illustrates the messages exchanged between an eNB and a UE when performing a contention-based RACH procedure.

The RACH procedure will be described in the following in more detail, with reference to FIGS. 7 and 8. A mobile terminal can be scheduled for uplink transmission, if its uplink transmission is time synchronized. Therefore, the Random Access Channel (RACH) procedure plays a role as an interface between non-synchronized mobile terminals (UEs) and the orthogonal transmission of the uplink radio access. For instance, the Random Access is used to achieve uplink time synchronization for a user equipment, which either has not yet acquired, or has lost, its uplink synchronization. Once a user equipment has achieved uplink synchronization, the base station can schedule uplink transmission resources for it. One scenario relevant for random access is where a user equipment in RRC_CONNECTED state, handing over from its current serving cell to a new target cell, performs the Random Access Procedure in order to achieve uplink time-synchronization in the target cell.

There can be two types of random access procedures allowing access to be either contention based, i.e., implying an inherent risk of collision, or contention free (non-contention based).

An exemplary definition of a random access procedure can be found in 3GPP TS 38.321, v15.6.0 section 5.1.

In the following, the contention-based random access procedure is being described in more detail with respect to FIG. 7. This procedure consists of four "steps," and thus can be termed as well 4-step RACH procedure. First, the user equipment transmits a random access preamble on the Physical Random Access Channel (PRACH) to the base station (i.e., message 1 of the RACH procedure). After the base station has detected a RACH preamble, it sends a Random Access Response (RAR) message (message 2 of the RACH procedure) on the PDSCH (Physical Downlink Shared Channel) addressed on the PDCCH with the (Random Access) RA-RNTI identifying the time-frequency and slot in which the preamble was detected. If multiple user equipment transmitted the same RACH preamble in the same PRACH resource, which is also referred to as collision, they would receive the same random access response message. The RAR message may convey the detected RACH preamble, a timing alignment command (TA command) for synchronization of subsequent uplink transmissions based on the timing of the received preamble, an initial uplink resource assignment (grant) for the transmission of the first scheduled transmission and an assignment of a Temporary Cell Radio Network Temporary Identifier (T-CRNTI). This T-CRNTI is used by the base station to address the mobile(s) whose RACH preamble was detected until the RACH procedure is finished, since the "real" identity of the mobile at this point is not yet known by the base station.

The user equipment monitors the PDCCH for reception of the random access response message within a given time window (e.g., termed RAR reception window), which can be configured by the base station. In response to the RAR message received from the base station, the user equipment transmits the first scheduled uplink transmission on the radio resources assigned by the grant within the random access response. This scheduled uplink transmission conveys the actual random access procedure message like for example an RRC Connection Request, RRC Resume Request or a buffer status report.

In case of a preamble collision having occurred in the first message of the RACH procedure, i.e., multiple user equipment have sent the same preamble on the same PRACH resource, the colliding user equipment will receive the same T-CRNTI within the random access response and will also collide in the same uplink resources when transmitting their scheduled transmission in the third step of the RACH procedure. In case the scheduled transmission from one user equipment is successfully decoded by base station, the contention remains unsolved for the other user equipment(s). For resolution of this type of contention, the base station sends a contention resolution message (a fourth message) addressed to the C-RNTI or Temporary C-RNTI. This concludes the procedure.

Figure 8:
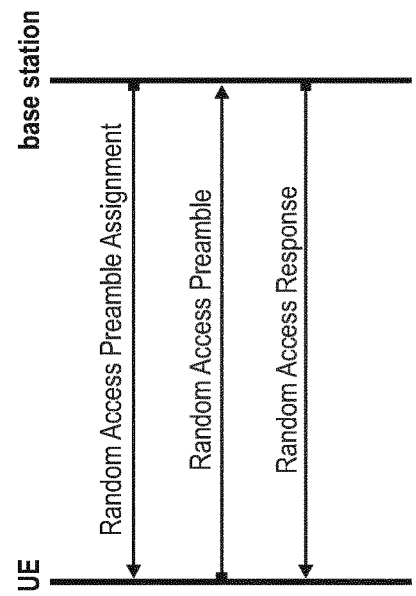
FIG. 8 illustrates the messages exchanged between an eNB and a UE when performing a contention-free RACH procedure.

FIG. 8 is illustrating the contention-free random access procedure, which is simplified in comparison to the contention-based random access procedure. The base station provides in a first step the user equipment with the preamble to use for random access so that there is no risk of collisions, i.e., multiple user equipment transmitting the same preamble. Accordingly, the user equipment is subsequently sending the preamble that was signaled by the base station in the uplink on a PRACH resource. Since the case that multiple UEs are sending the same preamble is avoided for a contention-free random access, essentially, a contention-free random access procedure is finished after having successfully received the random access response by the UE.

3GPP is also studying a 2-step (contention-based) RACH procedure for 5G NR, where a message 1 (can also be termed msgA), that corresponds to messages 1 and 3 in the four-step LTE RACH procedure, is transmitted at first. Then, the gNB will respond with a message 2 (can also be termed msgB), corresponding to messages 2 and 4 of the LTE RACH procedure. This msgB can include, e.g., a Success random access response (RAR), a Fallback RAR, and optionally a backoff indication. Some further assumptions are made for the 2-step RACH procedure, such as that the UE, after deciding on the RACH type (e.g., the 2-step RACH), keeps retrying that same RACH type until failure. But there may be also the possibility that the UE can fallback to the 4-step RACH procedure after a certain time.

Moreover, the network may semi-statically determine radio resources, to be used for performing the 2-step RACH procedure and the 4-step RACH procedure, that are exclusive from one another. The radio resources used for transmitting the first message in the RACH procedure include at least the RACH occasion as well as the preambles. For instance, in the 2-step RACH procedure, the first message msgA uses not only the PRACH resource (e.g., the RACH occasion and preamble) but also the associated PUSCH resources.

Due to the reduced message exchange, the latency of the 2-step RACH procedure may be reduced compared to the 4-step RACH procedure. On the other hand, the 2-step RACH can consume more radio resources than the 4-step RACH procedure, because additional PUSCH resources are required for the first message transmitted in the 2-step RACH procedure.

The network may, e.g., configure a UE to use only the 4-step RACH or 2-step RACH or to use both the 4-step RACH and the 2-step RACH.

Consequently, there will be the possibility that a UE supports both the 4-step RACH procedure and the 2-step RACH procedure. It is possible that selecting the appropriate type of RACH procedure (e.g., 2-step vs 4-step) can be based on an indication provided via system information to all UEs or could be done based on a UE-dedicated configuration for each UE separately, e.g., using RRC configuration message(s).

The inventors have identified disadvantages with the current preliminary agreements on how to select the type of RACH procedure that the UE is to perform.

For example, if the gNB instructs all the UEs to perform the type of RACH procedure using system information, then the radio resources for the instructed RACH type (e.g., 2-step) may become very congested and the radio resources for the other RACH type (e.g., 4-step) will be hardly utilized. This will have negative impact on the radio resource management as well as on the success of performing the random access procedure.

One the other hand, instructing UEs in a dedicated manner, e.g., using a dedicated RRC message, may not suffer from the above-discussed disadvantage when using system information. On the other hand, it may only be applicable to UEs in RRC_CONNECTED state that are actually connected to the network and are able to receive such a RRC message. Other UEs (e.g., in RRC Idle) might not be able to receive such information at all. This dedicated communication may further result in a significant signaling overhead.

Consequently, the inventors have identified the possibility to improve the random access procedure performed between the UE and the base station, particularly in case there are several different types of random access procedure.

In the following, UEs, base stations, and procedures to meet these needs will be described for the new radio access technology envisioned for the 5G mobile communication systems, but which may also be used in LTE mobile communication systems. Different implementations and variants will be explained as well. The following disclosure was facilitated by the discussions and findings as described above and may for example be based at least on part thereof.

In general, it should be noted that many assumptions have been made herein so as to be able to explain the principles underlying the present disclosure in a clear and understandable manner. These assumptions are however to be understood as merely examples made herein for illustration purposes that should not limit the scope of the disclosure. A skilled person will be aware that the principles of the following disclosure and as laid out in the claims can be applied to different scenarios and in ways that are not explicitly described herein.

Moreover, some of the terms of the procedures, entities, layers, etc., used in the following are closely related to LTE/LTE-A systems or to terminology used in the current 3GPP 5G standardization, even though specific terminology to be used in the context of the new radio access technology for the next 3GPP 5G communication systems is not fully decided yet or might finally change. Thus, terms could be changed in the future, without affecting the functioning of the embodiments. Consequently, a skilled person is aware that the embodiments and their scope of protection should not be restricted to particular terms exemplarily used herein for lack of newer or finally agreed terminology but should be more broadly understood in terms of functions and concepts that underlie the functioning and principles of the present disclosure.

For instance, a mobile station or mobile node or user terminal or user equipment (UE) is a physical entity (physical node) within a communication network. One node may have several functional entities. A functional entity refers to a software or hardware module that implements and/or offers a predetermined set of functions to other functional entities of the same or another node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

The term "base station" or "radio base station" here refers to a physical entity within a communication network. As with the mobile station, the base station may have several functional entities. A functional entity refers to a software or hardware module that implements and/or offers a predetermined set of functions to other functional entities of the same or another node or the network. The physical entity performs some control tasks with respect to the communication device, including one or more of scheduling and configuration. It is noted that the base station functionality and the communication device functionality may be also integrated within a single device. For instance, a mobile terminal may implement also functionality of a base station for other terminals. The terminology used in LTE is eNB (or eNodeB), while the currently used terminology for 5G NR is gNB.

Figure 9:
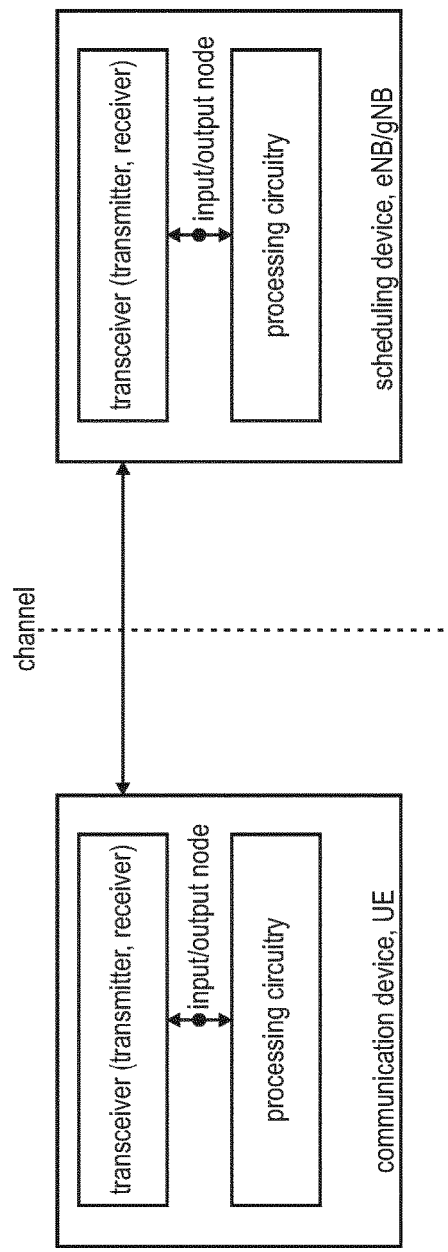
FIG. 9 illustrates the exemplary and simplified structure of a UE and a gNB.

FIG. 9 illustrates a general, simplified and exemplary block diagram of a user equipment (also termed communication device) and a scheduling device (here exemplarily assumed to be located in the base station, e.g., the eLTE eNB (alternatively termed ng-eNB) or the gNB in 5G NR). The UE and eNB/gNB are communicating with each other over a (wireless) physical channel respectively using the transceiver.

The communication device may comprise a transceiver and processing circuitry. The transceiver in turn may comprise and/or function as a receiver and a transmitter. The processing circuitry may be one or more pieces of hardware such as one or more processors or any LSIs. Between the transceiver and the processing circuitry there is an input/output point (or node) over which the processing circuitry, when in operation, can control the transceiver, i.e., control the receiver and/or the transmitter and exchange reception/transmission data. The transceiver, as the transmitter and receiver, may include the RF (radio frequency) front including one or more antennas, amplifiers, RF modulators/demodulators and the like. The processing circuitry may implement control tasks such as controlling the transceiver to transmit user data and control data provided by the processing circuitry and/or receive user data and control data, which is further processed by the processing circuitry. The processing circuitry may also be responsible for performing other processes such as determining, deciding, calculating, measuring, etc. The transmitter may be responsible for performing the process of transmitting and other processes related thereto. The receiver may be responsible for performing the process of receiving and other processes related thereto, such as monitoring a channel.

An improved procedure on how to perform a random access procedure will be described in the following.

FIG. 10 illustrates a simplified and exemplary UE structure according to one solution of the improved procedure, and can be implemented based on the general UE structure explained in connection with FIG. 9. The various structural elements of the UE illustrated in said figure can be interconnected between one another, e.g., with corresponding input/output nodes (not shown), e.g., in order to exchange control and user data and other signals. Although not shown for illustration purposes, the UE may include further structural elements.

As apparent from FIG. 10, the UE may include a random access type threshold values receiver, a random value determining circuitry, a random access type threshold value selecting circuitry, a value comparison circuitry, a random access procedure type selecting circuitry, and a random access procedure performing circuitry.

In the present case as will become apparent from the below disclosure, the processing circuitry can thus be exemplarily configured to at least partly perform one or more of determining a random value, selecting one out of plurality of the random access type threshold values, comparing the random value with the one random access type threshold value, selecting a random access procedure type, performing a random access procedure, determining whether an access attempt to a radio cell can be made or not as part of an access control procedure, etc.

The receiver can thus be exemplarily configured to at least partly perform one or more of receiving a plurality of random access type threshold values, receiving messages as part of a random access procedure, receiving information about associations between the random access type threshold values and other criteria (such as the RACH triggers, the access categories, channel qualities, radio cells), etc.

The transmitter can thus be exemplarily configured to at least partly perform one or more of transmitting messages as part of a random access procedure, etc.

FIG. 11 is a sequence diagram for an exemplary UE behavior according to the improved RACH procedure, which will be described in more detail in the following.

It is assumed that the UE supports several types of random access procedures, such as the 2-step and 4-step RACH (here the contention-based) procedures discussed above. In the following, it is exemplarily assumed that there are only two different types of random access procedures the UE needs to select from. However, the improved RACH procedure is not limited thereto, and a UE may equally select from more than two different RACH procedures.

It is further exemplarily assumed that the UE is responsible for taking the final decision on which type of RACH procedure it should perform, e.g., to access the radio cell. This decision may be controlled to some extent by the network operator (e.g., the gNB) by providing suitable parameters, to be used by the UE to arrive at a type of RACH procedure.

Correspondingly, the UE may receive a plurality of threshold parameters (could also be termed random access type threshold values or simply RACH type thresholds) to then be used for selecting the RACH type. As will be explained in more detail later, by providing a plurality of RACH type thresholds (instead of, e.g., one probability threshold), the network can perform an accurate and precise control of how different UEs will select the RACH type, for instance by allowing to take into account the RACH trigger, the access category associated with the RACH procedure to be performed, the channel quality of the radio link over which the RACH procedure is to be performed, or the radio cell, e.g., PCell vs. SCell, over which the RACH procedure is to be performed.

Although here and in the following the use of a plurality of RACH type thresholds is assumed, it is also possible to use only one RACH type threshold to control the RACH type selection at the UE. In this case, control of the RACH type selection may be less accurate and precise. On the other hand, the RACH type selection at the UE could be simplified, as well as the parameters to be configured by the network side (e.g., transmitted by the gNB) could be reduced thereby.

According to the improved RACH procedure, the RACH type selection will be performed based on a random value and the received RACH type thresholds. Correspondingly, the UE determines a random value. Further, the UE selects one out of the plurality of random access type threshold values, and compares the previously determined random value with the selected random access type threshold value. Based on the comparison result, the UE selects the type of random access procedure. Then, the UE performs the random access procedure according to the selected type.

By using this mechanism of comparing a UE-chosen random value against a network-defined threshold, the network can control the loading of 2-step and/or 4-step RACH resources in a suitable way. Furthermore, this mechanism facilitates that there is no need to configure particular UEs to perform the 2-step RACH or the 4-step RACH procedure.

FIG. 12 is a sequence diagram for an exemplary gNB behavior according to the improved RACH procedure, which will be described in more detail in the following. The gNB can transmit information on the plurality of random access type threshold values to the UE, such that the UE can use same to perform the RACH type selection as explained above and in the following. After the UE determines the type of RACH, the UE starts the RACH procedure, and the gNB can participate in the RACH procedure initiated by the UE, e.g., accordingly receiving the $1^{st}$ and $3^{rd}$ messages and transmitting the $2^{nd}$ and $4^{th}$ messages of the 4-step RACH (see FIG. 7 and related paragraphs above) or receiving the $1^{st}$ message and transmitting the $2^{nd}$ message of the 2-step RACH.

The random value as well as the values of the received RACH type thresholds should be coordinated in order to allow for a meaningful comparison. For instance, the RACH type thresholds and the random values could be defined as probabilities, e.g., their values being between 0 and 1 (non-integer values), or between 0 and 100. Correspondingly, when defining the probability threshold to be 0 or 1, the network ensures that the particular RACH type will always or never be used by the UEs in the radio cell.

The RACH type threshold could relate to one of the types of the RACH procedure, e.g., the 2-step RACH procedure, such that the RACH type selection explained above allows determining whether to select that type (e.g., 2-step RACH) of RACH procedure. For instance, in case the random value is lower than a first-type-related RACH threshold, the UE determines that the RACH procedure of the first type is to be selected. In case the random value is equal to or larger than the first-type-related RACH threshold, the UE determines that the RACH procedure of the first type is not to be selected, but rather that the RACH procedure of the second type is selected. Here, because it was exemplarily assumed that there are only two different RACH procedures (see above, 2-step RACH versus 4-step RACH), there would be no further need to perform another RACH type selection procedure, because the UE could directly determine to use the one or other RACH type (e.g., 4-step) based on a single RACH type selection.

Differentiating between more than two different RACH procedures is equally possible, although in that case it might be necessary to, e.g., provide another RACH type threshold and/or for the UE to perform more than one RACH type selection.

As already mentioned above, the UE can be provided with a plurality of random access type threshold values, each of these being associated with a particular parameter or criterion that could be taken into account for the RACH type selection. For instance, the network could differentiate the RACH type selection per RACH trigger, and/or per access category, and/or per channel quality and/or per radio cell to be used, and/or some other suitable criteria.

In more detail, the RACH procedure can be triggered by different events, e.g., as listed above for an exemplary 3GPP-standard implementation. For some or all of these different RACH trigger events, a different RACH type threshold value could be defined by the network and provided to the UE. Correspondingly, when performing the RACH type selection, the UE determines that RACH type threshold that is associated with the RACH trigger that triggered the current RACH to be performed. The previously-generated random value is then compared against that RACH-trigger-specific RACH type threshold to decide with type of RACH is to be performed.

Which particular values would be associated with each RACH trigger can be determined by the network, based on considerations such as how important or how urgent the RACH trigger is. For instance, the RACH trigger "Request for Other SI" is less urgent than the "RRC Connection Re-establishment procedure," as the latency requirement for acquiring an "Other SI" is less restrictive than the latency requirement for resuming from a lost RRC connection. In this sense, the network can configure the RACH type threshold values in a way that a UE is more likely to perform the 2-step RACH procedure when its RACH trigger is "RRC Connection Re-establishment," and the UE is more likely to perform the 4-step RACH procedure when its RACH trigger is "Request for Other SI."

Moreover, the RACH procedure is closely linked to the access categories mentioned above in connection with the unified access control (UAC) procedure. For instance, it was exemplarily assumed that almost each RACH is preceded by an access attempt under control of the UAC procedure performed at the UE. The RACH trigger can thus be linked to a particular access category. In the following, an exemplary association between the RACH triggers and possible Access Categories is presented.

| RACH trigger | Associated Access Category |
| --- | --- |
| Initial access from RRC_IDLE | AC2, AC8 |
| RRC Connection Re-establishment procedure | AC8 |
| DL or UL data arrival during RRC_CONNECTED when UL synchronization status is "non-synchronized" | DL = PDCCH ordering = contention-free; UL = AC4/5/6/7 |
| UL data arrival during RRC_CONNECTED when there are no PUCCH resources for SR available | AC4/5/6/7 |
| SR failure | AC4/5/6/7 |
| Request by RRC upon synchronous reconfiguration (e.g.,, handover) | AC8 |
| Transition from RRC_INACTIVE | AC2, AC8 |
| To establish time alignment at SCell addition | PDCCH ordering = contention-free |
| Request for Other SI (see subclause 7.3) | AC8 |
| Beam failure recovery | contention-free |

Thus, for instance, a UE performing a RACH procedure, triggered because of an initial access from RRC Idle, selects a RACH type threshold value that is associated with the Access Category 2 or 8 (below excerpt is from table further above), because the RACH attempt is a result of RRC-level signaling.

| Access Category number | Conditions related to UE | Type of access attempt |
| --- | --- | --- |
| 2 | All | Emergency |
| 8 | All except for the conditions in Access Category 1 | MO signaling on RRC level resulting from other than paging |

For other RACH triggers, several access categories are possible, and the UE could refer to the previously-performed UAC procedure to determine the Access category of the access attempt.

For the purposes of this disclosure, some of the RACH triggers (such as beam failure recovery, time alignment at SCell addition, DL data arrival when non-synchronized) need not be necessarily associated with an access category, because they are performed as a contention-free RACH procedure, for which no type has to be selected (because it is exemplarily assumed that there will be only one type of contention-free RACH procedure).

Which particular values would be associated with each access category can be determined by the network, based on considerations such as how important or how urgent the access category is. For instance, the Access Category 2 (Emergency) is more urgent than the Access Category 7 (MO data that do not belong to any other Access Categories), as obviously the latency requirement for an emergency call should be much more restrictive than the latency requirement of low-priority uplink traffic. In this sense, the network can configure the RACH type threshold values in a way that a UE is more likely to perform the 2-step RACH procedure when the RACH procedure is triggered by Access Category 2, and the UE is more likely to perform the 4-step RACH procedure when the RACH procedure is triggered by Access Category 7.

As another possibility, each RACH type threshold could be associated to a channel quality (e.g., RSRP/RSRQ) value or range. In consequence, the UE thus determines (measures) the quality of the channel over which the RACH procedure will be performed (e.g., RSRP and/or RSRQ of the beam), and then determines the RACH type threshold that is associated with the determined channel quality. This determined channel-quality-specific RACH type threshold can then be used to compare the random value against.

Which particular values would be associated with each channel quality can be determined by the network, based on considerations such as resource utilization efficiency. Using the 2-step RACH procedure will consume more radio resources (PUCCH+PUSCH), and therefore failing a 2-step RACH procedure will result in more penalty than failing a 4-step RACH procedure. In this sense, network may want the successful rate of performing a 2-step RACH procedure to be higher than the successful rate of performing a 4-step RACH procedure. As a result, the network can configure the RACH type threshold values in a way that a UE is more likely to perform the 2-step RACH procedure when the link quality between the UE and gNB is good, and the UE is more likely to perform the 4-step RACH procedure when the link quality between the UE and gNB is bad.

As still another possibility, each RACH type threshold could be associated to a particular radio cell over which the RACH procedure is to be performed, such as the PCell or one of the SCell(s). No distinction has been made so far on the radio cell over which the RACH procedure will be performed. For example, it is typically assumed that the contention-based RACH procedure is always performed over the PCell. Nevertheless, e.g., in future 3GPP releases it might be possible that the contention-based RACH procedure is performed over one of the configured one or more SCells. In such a scenario, the network could be interested to separately control the use of the 2-step and 4-step RACH procedures in a PCell and an SCell. Correspondingly, the network could define different RACH type threshold values for the PCell and the one or more SCells. For instance, if the RACH procedure shall be performed over one of the SCells, the UE would first determine the RACH type threshold that is associated with that SCell, and compare the previously-determined random value against that SCell-specific RACH type threshold.

Which particular values would be associated with each radio cell can be determined by the network, based on considerations such that the RACH procedures performed in PCell should have higher priority than the RACH procedure performed in an SCell. It is because if a UE is performing a RACH procedure in an SCell, some other UEs may also want to perform the RACH procedure in the same cell that is a PCell for them. By assuming the RACH procedure performed in a PCell is more urgent/important than the RACH procedure performed in an SCell, the network can configure the RACH type threshold values in a way that a UE is more likely to perform the 2-step RACH procedure when the RACH procedure is performed in PCell, and the UE is more likely to perform the 4-step RACH procedure when the RACH procedure is performed in the SCell.

Moreover, some or all of the above-discussed criteria (RACH trigger, access category, channel quality, radio cell) could be taken into account for the RACH type selection, by providing RACH type thresholds that are associated to some or all of the above-discussed criteria. For instance, by providing RACH type thresholds that are associated to the access category as well as the type of radio cell could be beneficial. But also other combinations are equally possible, depending on the interest of the network operator.

The above-presented associations between the RACH type thresholds and the different criteria can be provided to the UE in different ways. One exemplary solution is to broadcast this association in system information (e.g., in SIB1). In this way, all UEs in a radio cell will be able to determine the association and be kept updated through the already-established system information update mechanism in case the associations are changed by the network.

According to one particular exemplary implementation where the RACH type thresholds are associated with different access categories, information on this association could be transmitted together with the access attempt threshold information. To said end, when using a 3GPP-standard specific implementation, the corresponding information element, carried by SIB1, and including information on the access attempt thresholds of one particular access category (UA-BarringInfoSetList of SIB1, see 3GPP 38.331) could be extended, e.g., as follows to carry information on the association between a RACH type threshold (here, e.g., 2stepRACH-ProbThres, as being used to determine whether or not the 2-step RACH is to be used or not) and an access category.

UAC-BarringInfoSetList Information Element

```
-- ASN1START
TAG-UAC-BARRINGINFOSETLIST-START
UAC-BarringInfoSetList ::=        SEQUENCE (SIZE(1..maxBarringInfoSet) ) OF
                                      UAC-BarringInfoSet
UAC-BarringInfoSet ::=            SEQUENCE{
uac-BarringFactor                     ENUMERATED {p00, p05, p10, p15, p20, p25,
                                          p30, p40, p50, p60, p70, p75,
                                          p80, p85, p90, p95} ,
2stepRACH-ProbThres                   ENUMERATED {p00, p10, p20, p30, p40,
                                          p50, p60, p70, p80, p90,
                                          p100} ,
uac-BarringTime                       ENUMERATED {s4, s8, s16, s32, s64, s128,
                                          s256, s512} ,
uac-BarringForAccessIdentity          BIT STRING (SIZE (7) )
}
-- TAG-UAC-BARRINGINFOSETLIST-STOP
-- ASN1STOP
```

Different values can be defined for the RACH type threshold (here, e.g., 10 percent steps from 0 to 100), where p00 could imply that only 4-step RACH is configured for this access category and p100 could imply that only 2-step RACH is configured for this access category; in this respect it is exemplarily assumed that any random value smaller than the 2-step-RACH-specific threshold would lead to the use of the 2-step RACH, while any random value equal to or larger than the 2-step-RACH-specific threshold would lead to not using the 2-step RACH, but to using the only other RACH type, i.e., the 4-step RACH.

In the above, the association between different RACH type thresholds and access categories, carried by the UAC-BarringInfoSetList information element, was described. Similarly, the associations of the RACH type thresholds with the other criteria (e.g., RACH Trigger, channel quality, PCell/SCell) can be transmitted in corresponding information elements, such as those presented in the following. All these information elements can be transmitted, e.g., via system information, e.g., the SIB1.

In particular, the Trigger-RACHTypeSelect information element associates a particular RACH Trigger event (here identified by "rach-TriggerEvent") with a particular RACH type threshold (here identified by 2stepRACH-ProbThres).

Trigger-RACHTypeSelect Information Element

```
ASN1START
TAG-TRIGGER-- RACHTYPESELECT-START
Trigger-RACHTypeSelectList ::=      SEQUENCE (SIZE(1..maxRACHTypelist) )
                                        OF Trigger-RACHTypeSelect
Trigger-RACHTypeSelect ::=          SEQUENCE{
   rach-TriggerEvent                BIT STRING (SIZE(X) ) ,
   2stepRACH-ProbThres                 ENUMERATED{p00, p10, p20, p30,
                                p40, p50, p80, p70, p80, p90, p100} ,
}
-- TAG-TRIGGER-RACHTYPESELECT-STOP
-- ASN1STOP
```

The ChannelQ-RACHTypeSelect information element associates different channel qualities (here identified by channel-Quality-UpperBound and channel-Quality-LowerBound) with a particular RACH type threshold (here identified by 2stepRACH-ProbThres).
ChannelQ-RACHTypeSelect Information Element

```
-- ASN1START
-- TAG-CHANNELQ-RACHTYPESELECT-START
ChannelQ-RACHTypeSelectList ::=    SEQUENCE (SIZE(1..maxRACHTypelist) )
                                       OF ChannelQ-RACHTypeSelect
ChannelQ-RACHTypeSelect ::=        SEQUENCE{
   channel-Quality-UpperBound           INTEGER (0..127) ,
   channel-Quality-LowerBound           INTEGER (0..127) ,
   2stepRACH-ProbThres              ENUMERATED {p00, p10, p20, p30,
                                p40, p50, p60, p70, p80, p90, p100} ,
}
-- TAG-CHANNELQ-RACHTYPESELECT-STOP
-- ASN1STOP
```

The Cell-RACHTypeSelect information element associates different radio cells (here identified by cell-Type) with a particular RACH type threshold (here identified by 2stepRACH-ProbThres).
Cell-RACHTypeSelect Information Element

```
----- ASN1START
TAG-CELL-PACHTYPESELECT-START
Cell-RACHTypeSelectList ::=        SEQUENCE (SIZE(1..maxRACHTypelist) ) OF
                                       Cell-RACHTypeSelect
Cell-RACHTypeSelect ::=            SEQUENCE{
   cell-Type                            ENUMERATED {PCell, SCell} ,
   2stepRACH-ProbThres              ENUMERATED {p00, p10, p20, p30,
                                p40, p50, p60, p70, p80, p90, p100} ,
}
-- TAG-CELL-RACHTYPESELECT-STOP
-- ASN1STOP
```

Instead of defining the threshold for the 2-step RACH procedure, it is also possible to define a threshold for using the 4-step RACH procedure and using same in the RACH type selection in a corresponding manner. The following is an example of such a 4-step RACH threshold configuration:

```
4stepR-ACH-ProbThres    ENUMERATED {p00, p10, p20, p30, p40,
                        p50, p60, p70, p80, p90, p1001,
```

In that case for instance, any random value smaller than the 4-step-RACH-specific threshold would lead to the use of the 4-step RACH, while any random value equal to or larger than the 4-step-RACH-specific threshold would lead to not using the 4-step RACH, but to using the only other RACH type, i.e., the 2-step RACH.

In the following, variations of the above-described improved RACH procedure will be described in detail. For instance, some of these variations revolve around the interrelation between the UAC procedure and the RACH procedure. UAC, as currently specific in 3GPP, has been introduced above. In order to avoid repetitions, reference is made to those detailed explanations and only a brief summary is presented. In summary, the UE performs an access control procedure (UAC) to determine whether it should make an access attempt to the radio cell or not. The UAC check is based on the one or more access identities of the access attempt and, in case an access attempt is not allowed based on the access identities, the UAC check is continued based on the access category of the access attempt. As mentioned before, the UE determines a random value and compares same against the access attempt threshold associated with the access category (UAC-BarringFactor). The UE is barred from accessing the cell, e.g., in case the random value is equal to or larger than the threshold, and the UE can perform an access attempt in case the random value is less than the threshold.

A positive access attempt check (i.e., the UE can perform an access attempt) can be followed by a RACH procedure, e.g., according to one of the above improved RACH procedures. According to one exemplary implementation, the UAC procedure and the improved RACH procedure, although they may be subsequent, can be performed independently from one another. For instance, the UE performs first the UAC procedure, including—if necessary—the steps of drawing a random value and comparing same to the appropriate access attempt threshold (e.g., the UAC-BarringFactor). Subsequently, as part of the improved RACH type selection solutions explained above, the UE draws another random value and compares this other random value to the appropriate RACH type threshold to select the type of the RACH procedure to be performed.

Figure 13:
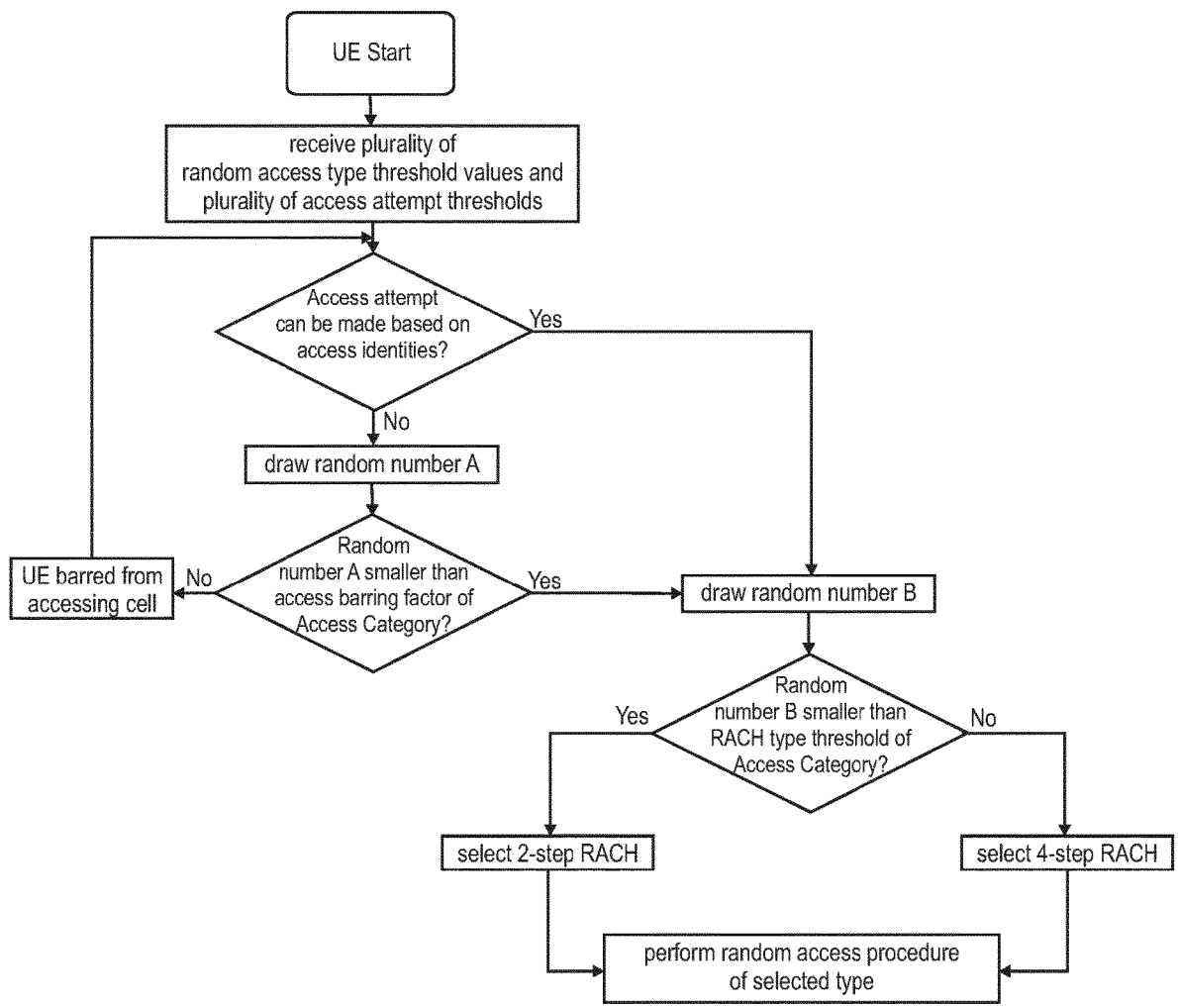
FIG. 13 is a flow diagram for the behavior of a UE, according to an exemplary implementation for an improved solution.

This solution is illustrated in FIG. 13, which is a sequence diagram for an exemplary UE behavior according to the improved RACH procedure. In line with the above explanation, the UE may have to draw random numbers two times, one random number A during the UAC check (based on the access category) and another random number B for the RACH type selection. The respective checks are then made based on the respective random number.

Separating the two procedures from one another facilitates that the UAC procedure need not be changed. Further, the RACH type selection is independent from the UAC procedure, such that the RACH type selection can be controlled independently by the network.

According to another exemplary implementation, instead of drawing a random number two times as done for the above-solution as explained, e.g., in FIG. 13, the UAC and RACH type selection procedures are interrelated so as to facilitate that a random number need to be drawn only once. In particular, if a random number is already drawn as part of the UAC procedure, the UE may reuse that random number also for the RACH type selection and does not draw another random number (random number B in solution of FIG. 13). Otherwise, if no random number is drawn as part of the UAC procedure (e.g., because access attempt is allowed already based on one of the access identities), then, the UE shall draw a random number for selecting the RACH type.

It should be further noted that the RACH type threshold value and the access attempt threshold value work together to determine how many UEs access the cell based on a particular type of RACH procedure. For instance, when the RACH type threshold value is set higher than the access attempt threshold value, the network may achieve that the random value is always lower than the RACH type threshold value, because exemplary only those UEs with random value<access attempt threshold value perform an access attempt and thus perform the RACH type selection. This would result in that all the UE always select the same type of RACH procedure.

An exemplary sequence of checks is presented in the following. If the uac-BarringFor AccessIdentity-based check results in that the UE needs to check further based on the uac-BarringFactor, the UE draws a random value (RAN_Value, 0 . . . 99).

If 2stepRACH-ProbThres<uac-BarringFactor
      If uac-BarringFactor<=RAND_VALUE→UE is not allowed to access the cell
      If 2stepRACH-ProbThres<=RAND_VALUE<uac-BarringFactor→UE uses the 4-step RACH
      If RAND_VALUE<2stepRACH-ProbThres→UE uses the 2-step RACH
   If uac-BarringFactor<=2stepRACH-ProbThres
      If uac-BarringFactor<=RAND_VALUE→UE is not allowed to access the cell
      If RAND_VALUE<uac-BarringFactor→UE uses 2-step RACH If the uac-BarringForAccessIdentity-based check results in that the UE is allowed to access the cell, UE draws a random value (RAND_VALUE, 0 . . . 99)

Figure 14:
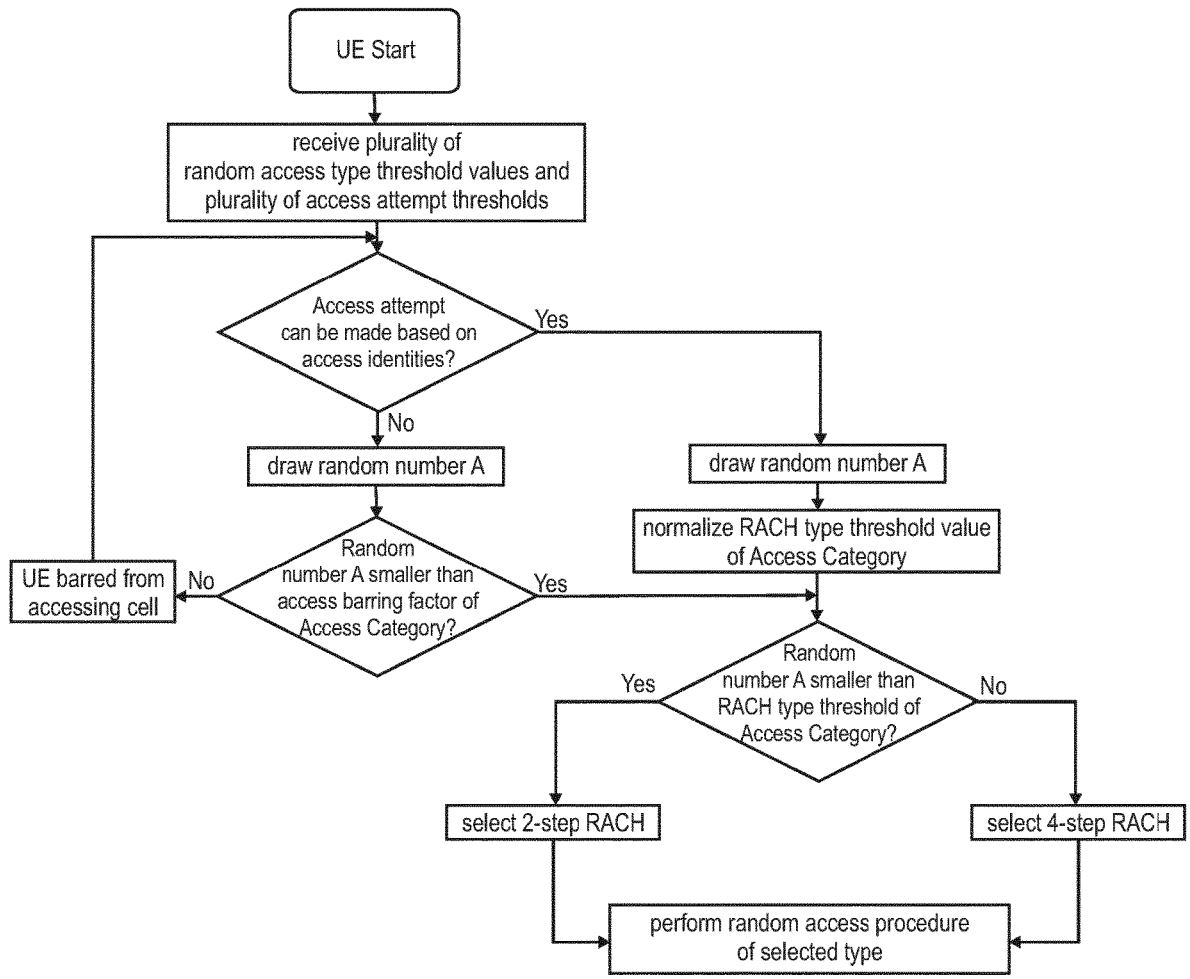
FIG. 14 is a flow diagram for the behavior of a UE, according to an exemplary implementation for an improved solution.

If 2stepRACH-ProbThres<=RAND_VALUE→UE uses the 4-step RACH
   If RAND_VALUE<2stepRACH-ProbThres→UE uses the 2-step RACH One exemplary implementation of the above solution where only one random value needs to be determined is illustrated in FIG. 14, which is a sequence diagram for an exemplary UE behavior according to the improved RACH procedure. As apparent therefrom, the UE needs to determine only one random number A, in any case. The RACH type selection is then performed based on this random number A that may have been already drawn and used for the access attempt check performed based on the access category.

These exemplary implementations have the advantage that in any case only one random number needs to be drawn at the UE. Determining a random is processor consuming and increases the UE complexity, and it is typically preferred to avoid these drawbacks. Moreover, the UAC check can remain exactly the same as currently defined, because no change is actually necessary. For instance, the additional process of drawing a random number A in case the access attempt is granted due to a matching access identity can be part of the RACH type selection.

FIG. 14 further illustrates an optional step of normalizing the RACH type threshold value, which can be performed in case the access attempt is allowed based on the access identity. In more detail, assuming for instance that the access attempt threshold value is set to 0.8, meaning that 80% of the UE will be allowed to perform an access attempt with the cell (based on the random number A, see FIG. 14). It is further exemplarily assumed that the RACH type threshold value is 0.4. Keeping in mind that only those UEs with a random value A of 0-0.8 attempt the access, this RACH type selection results in that in effect 50% (i.e., 0.4/0.84) of those UEs attempting the access will be using, e.g., the 2-step RACH. However, in case the access attempt is allowed based on the access identity, when having to draw a random number A, the range of random values of UEs performing the RACH type selecting is between 0 and 1. This results in that in effect 40% (0, 4/1) of those UEs attempting the access will be using, e.g., the 2-step RACH. Therefore, the control of the RACH type selection differs depending on how the access decision is allowed for the UE, be it based on the access identity or based on the access category.

In order to allow for a uniform control of the RACH type selection, a normalizing step can be optionally introduced, e.g., when the access attempt is allowed based on the access identity. In particular, the normalizing step adapts the value of the RACH type threshold such that the probability of selecting a particular type of RACH procedure is the same when having been allowed to access the cell based on access identities and when having been allowed to access the cell based on access categories. The normalization is further dependent on the value of the access attempt threshold. For instance, in the above-used exemplary scenario, the RACH type threshold could be normalized to 0.5. In general, the normalized RACH type threshold value can be calculated by "old RACH type threshold value"/"access attempt threshold value," in the above case 0.4/0.8=0.5.

As explained before, information on the association could be transmitted together with the access attempt threshold information. To said end, when using a 3GPP-standard specific implementation, the corresponding information element, carried by SIB1, and including information on the access attempt thresholds of one particular access category (UA-BarringInfoSetList of SIB1, see 3GPP 38.331) could be extended, e.g., as follows to carry information on the association between a RACH type threshold (here, e.g., 2stepRACH-ProbThres, as being used to determine whether or not the 2-step RACH is to be used or not) and an access category.

UAC-BarringInfoSetList Information Element ers. In particular, transmitting entities perform LBT, and channel occupation is only allowed after a successful LBT Clear Channel Assessment (CCA), so as to facilitate the coexistence with other systems, such as Wi-Fi (IEEE 802.11) systems operating at these unlicensed bands (see, e.g., 3GPP Technical Report TR 36.889, version 13.0.0).

```
-- ASN1START
-- TAG-UAC-BARRINGINFOSETLIST-START
UAC-BarringInfoSetList ::=      SEQUENCE (SIZE(1..maxBarringInfoSet) ) OF
                                    UAC-BarringInfoSet
UAC-BarringInfoSet ::=          SEQUENCE {
uac-BarringFactor               ENUMERATED {p00, p05, p10, p15, p20, p25,
                                    p30, p40, p50, p60, p70, p75,
                                    p80, p85, p90, p95} ,
2stepRACH-ProbThres             ENUMERATED {p00, p05, p10, p15, p20,
                                    p25, p30, p40, p50, p60, p70,
                                    p75, p80, p85, p90, p95} ,
uac-BarringTime                 ENUMERATED {s4, s8, s16, s32, s64, s128,
                                    s256, s512} ,
uac-BarringForAccessIdentity    BIT STRING (SIZE (7) )
}
-- TAG-UAC-BARRINGINFOSETLIST-STOP
-- ASN1STOP
```

In this exemplary solution, the particular values for the 2-stepRACH-ProbThres are the same as for the uac-BarringFactor so as to allow the network to define the same threshold for the barring and the RACH type selection. In particular, when selecting the same RACH Type threshold as for the access attempt threshold, the network can control that the UEs perform the RACH according to one type only.

According to further solutions, the network (e.g., the gNB) can change the value of the RACH type threshold dynamically (optionally also the value of the access attempt threshold) and then transmit the updated RACH type threshold (optionally also the updated access attempt threshold) to the UEs, e.g., in the system information.

The network may consider different criteria for dynamically adapting the threshold(s). Such criteria may involve, e.g., the loading of the radio cell or the availability of the uplink radio resources. For instance, the loading of the radio cell can be determined at the gNB, so as to determine the appropriate value of the RACH type threshold (and optionally of the access attempt threshold). In one exemplary implementation, if the cell load is high (e.g., above a particular threshold such as there are 1000 active UEs in RRC_CONNECTED mode), the RACH type threshold could be adapted so as to allow less UEs to use the 2-step RACH procedure. The 2-step RACH procedure will consume more radio resources because of the combined PRACH and PUSH transmission in the first message, such that in high-load situations, the available radio resource might not be sufficient to support the 2-step RACH procedure, but may still be able to support the 4-step RACH procedure. Conversely, if the cell load is low (e.g., below that same particular threshold), the RACH type threshold could be adapted so as to allow more UEs to use the 2-step RACH procedure. The same or similar dynamic adaptation based on the cell load can also be performed for the access attempt threshold (e.g., the uac-barringfactor).

On the other hand, the availability of uplink resources can change significantly from time to time. Although this is true in general, this is particularly true for an unlicensed radio cell (e.g., NR-U scenarios). Usage of the unlicensed bands has become a focus for the new 5G-NR development. In NR, Listen-Before-Talk is to be performed on unlicensed carriers. Correspondingly, the resources may be repeatedly blocked by other terminals or WIFI nodes, such that the availability of uplink resources for the UEs controlled by the gNB is low. On the other hand, if there are few other UEs or WiFi nodes using the unlicensed carrier, the availability of uplink resources for the UEs controlled by the gNB is high. The gNB, which may also perform a CCA of its own to determine the availability of uplink resources in its radio cell, can adapt the RACH Type threshold to the changing availability. For instance, if the uplink resources are scarce (e.g., below a particular threshold such as where the channel occupancy time is less than 30% of the total time), the gNB could adapt the RACH type threshold so as to allow less UEs to use the 2-step RACH procedure. Considering that the 2-step RACH procedure will consume more radio resources than the 4-step RACH procedure, if the gNB can hardly obtain the channel, the available radio resources will not be sufficient to support the 2-step RACH, but may still be able to support the 4-step RACH. On the other hand, if the uplink resources are amply available (e.g., above a particular threshold, such as where the channel occupancy time is more than 90% of the total time), the RACH type threshold could be adapted so as to allow more UEs to use the 2-step RACH procedure.

The same or similar dynamic adaptation based on the cell load can also be performed for the access attempt threshold (e.g., the uac-barringfactor).

Instead of broadcasting the updated RACH type threshold (optionally also the updated access attempt threshold) in system information as mentioned above, the gNB may also provide the updated values in or together with a COT-indication (Channel Occupancy Time indication) to the UEs. The COT indication is transmitted by the gNB (in the CO-PDCCH) to indicate to the UEs that the channel is now available. This COT indication can be extended further so as to carry information on the updated values of one or both of the RACH type threshold and the access attempt threshold. If the UE receives the updated values via the CO-PDCCH, the previous values received via system information are overwritten with the new values.

Figure 15:
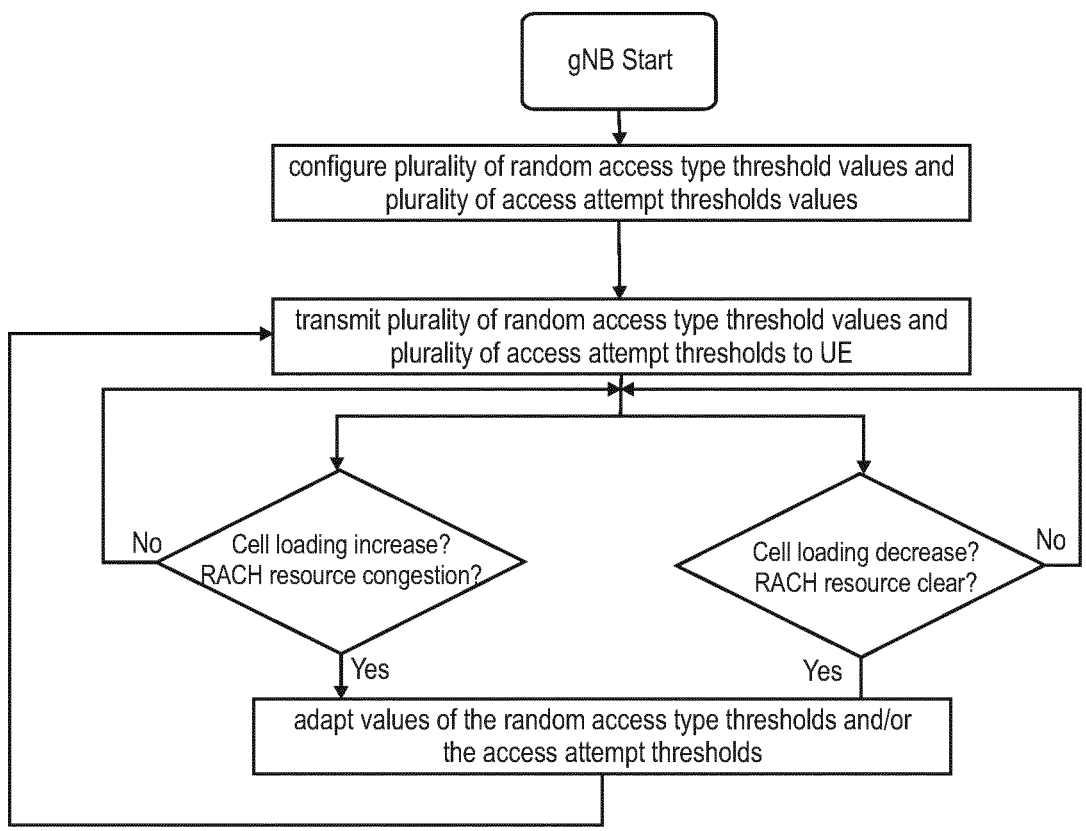
FIG. 15 is a flow diagram for the behavior of a gNB, according to an exemplary implementation for an improved solution.

FIG. 15 illustrates a sequence diagram for an exemplary behavior of the gNB to update the RACH type threshold, according to an exemplary implementation. As apparent therefrom, it is assumed that the gNB configures a plurality of RACH type thresholds and access attempt thresholds, according to one of the above discussed solutions. Information on these thresholds is then transmitted to the UE (e.g., via system information) so as to be used for the RACH type selection and respectively UAC procedure. As discussed above, in order to update the thresholds values, the gNB may monitor the cell load and the availability of the uplink resources (in illustration of FIG. 15, termed RACH resource congestion and RACH resource clear). If there is a significant change in any of the monitored criteria, the gNB can decide to adapt any or both of the RACH type threshold and the access attempt threshold and transmit the updated values to the UEs (e.g., broadcasting again in system information or in a COT, or in a dedicated manner as explained below).

According to further exemplary implementations, the RACH type threshold can be provided to the UEs in still other ways, for instance in a dedicated manner. In more detail, the gNB can transmit a dedicated RRC message to the UE, e.g., in case of a handover or conditional handover scenario. In particular, the UE exchanges during a handover some RRC messages with the old and new gNB. One of these RRC messages could be adapted to carry the value of the RACH type threshold, that the UE can use for determining the type of the contention-based RACH during or shortly after the handover execution. In one exemplary implementation, this RACH type threshold value is applicable to all access categories, and further it may be valid until the UE acquires the RACH type thresholds of the target radio cell, e.g., via the system information.

Another way of transmitting the RACH type threshold value to the UEs is to use a message of the RACH procedure, e.g., in those cases where the RACH procedure fails (e.g., due to a contention). In one implementation, the $2^{nd}$ or $4^{th}$ message carrying the backoff indicator can additionally carry the (updated) RACH type threshold value. The UE can thus perform a new RACH type selection (after the failed RACH procedure) using a different value for the subsequent RACH attempt. In one exemplary implementation, this RACH type threshold value is applicable to all access categories, and further it may be valid until the UE acquires the RACH type thresholds of the radio cell, e.g., via the system information.

These solutions are beneficial if the network needs to alleviate the 2-step or 4-step RACH radio resources in a short time. Using system information to update the RACH type threshold values can be done in parallel so as to reach all UEs in the radio cell, but it may take longer because the system information update is typically executed in the next system information modification period.

Further Aspects

According to a first aspect, a user equipment, UE, comprising a receiver, which receives a plurality of random access type threshold values. The UE further comprises processing circuitry, which determines a random value. The processing circuitry selects a type of a random access procedure to be performed by the UE, wherein the selecting comprises at least
  selecting one out of the plurality of random access type threshold values,
  comparing the determined random value against the selected random access type threshold value, and
  selecting a type of the random access procedure based on the result of the comparison. The UE performs the random access procedure of the selected type.

According to a second aspect provided in addition to the first aspect, the processing circuitry determines whether an access attempt to a radio cell can be made or not. In an optional implementation, the access attempt involves performing the random access procedure. In a further optional implementation, the access attempt is associated with one or more access identities and one access category, wherein the processing circuitry determines whether the access attempt to the radio cell can be made or not:
  first based on the one or more access identities and
    then, if the access attempt cannot be made based on the one or more access identities, based on the access category, wherein determining whether the access attempt can be made or not based on the access category involves determining an access attempt threshold value, that is associated with the access category of the access attempt.

According to a third aspect provided in addition to the second aspect, determining whether the access attempt can be made or not involves determining a second random value and comparing the second random value against the access attempt threshold value.

According to a fourth aspect provided in addition to the second aspect, determining whether the access attempt can be made or not involves comparing the same random value, to be used for selecting the random access procedure type, against the access attempt threshold value. In an optional implementation, in case of determining that the access attempt can be made based on the one or more access identities, selecting the random access procedure type involves normalizing the random access type threshold value based on the access attempt threshold value, such that for example a probability of performing the random access procedure of one type in case of a successful attempt based on the access identity is the same or similar as a probability of performing the random access procedure of the same one type in case of a successful attempt based on the access category.

According to a fifth aspect, provided in addition to one of the first to fourth aspects, the plurality of random access type threshold values relate to the use of one of the various types of the random access procedure, such as a 2-step random access procedure or a 4-step random access procedure. In an optional implementation, the random value being lower than the random access type threshold value is associated with a first type of the random access procedure, and wherein the random value being larger or equal to the random access type threshold value is associated with a second type of the random access procedure. In an optional implementation, the random value is a non-integer value determined between 0 and 1, and the random access type threshold is also a non-integer value between 0 and 1.

According to a sixth aspect, provided in addition to one of the first to fifth aspects, among the plurality of random access type threshold values there is one random access type threshold value associated with each of different random access trigger events that trigger the UE to perform a random access procedure, wherein selecting the one random access type threshold value involves determining the random access type threshold value that is associated with the random access trigger that triggered the random access procedure to be performed. Additionally or alternatively, among the plurality of random access type threshold values there is one random access type threshold value associated with each of different access categories of an access attempt, wherein selecting the one random access type threshold value involves determining the random access type threshold value that is associated with the access category of the access attempt. Additionally or alternatively, among the plurality of random access type threshold values there is one random access type threshold value associated with each of different set of channel qualities, wherein selecting the one random access type threshold value involves 1) determining the channel quality of a radio link between the UE and a base station via which the random access procedure is to be performed, and 2) determining the random access type threshold value that is associated with the determined channel quality. Additionally or alternatively, among the plurality of random access type threshold values there is one random access type threshold value associated with each of different radio cells of a base station, and wherein selecting the one random access type threshold value involves determining the random access type threshold value associated with the radio cell over which the random access procedure is to be performed, optionally wherein the different radio cells are a primary radio cell and one or more secondary radio cells.

According to a seventh aspect provided in addition to the sixth aspect, the receiver, when in operation, receives a system information broadcast from a base station in a radio cell, wherein the system information includes one or more of:
information on an association between the random access type threshold value and the random access trigger event,
information on an association between the random access type threshold value and the access category, optionally together with information on an association between the access attempt threshold value and the access category,
information on an association between the random access type threshold value and the channel quality,
information on an association between the random access type threshold value and the radio cell over which the random access procedure is to be performed.

According to an eighth aspect provided in addition to one of the first to seventh aspects, the receiver receives a single random access threshold value from a base station in a radio cell to be used for selecting a type of random access procedure instead of using one out of the plurality of random access type threshold values. In an optional implementation, the single random access threshold value is received in a message of a failed random access procedure performed between the base station and the UE, optionally in a random access response of the failed random access procedure, or in a message of a handover procedure performed by the UE with a source and target base station.

According to a ninth aspect provided in addition to one of the first to eighth aspects, the random access procedure is one of a 2-step random access procedure and a 4-step random access procedure. In one optional implementation, the 2-step random access procedure at least involves that:
a transmitter of the UE transmits a random access preamble and uplink data to a base station,
the receiver receives a random access response and at least the information on a contention resolution.
The 4-step random access procedure at least involves that:
a transmitter of the UE transmits a random access preamble to a base station,
the receiver receives a random access response, indicating radio resources to be used by the UE,
the transmitter transmits uplink data using the indicated radio resources,
the receiver receives information on a contention resolution.

According to a tenth aspect, a method is provided comprising the following steps performed by a user equipment, UE:
receiving a plurality of random access type threshold values,
determining a random value,
selecting a type of a random access procedure to be performed by the UE, wherein the selecting comprises at least
selecting one out of the plurality of random access type threshold values,
comparing the determined random value against the selected random access type threshold value, and
selecting a type of the random access procedure based on the result of the comparison,
performing the random access procedure of the selected type.

According to an eleventh aspect, provided in addition to the tenth aspect, the method further comprises the step of determining whether an access attempt to a radio cell can be made or not. In an optional implementation the access attempt involves performing the random access procedure. In an optional implementation, the access attempt is associated with one or more access identities and one access category, and the determining involves determining whether the access attempt to the radio cell can be made or not:
first based on the one or more access identities and
then, if the access attempt cannot be made based on the one or more access identities, based on the access category, wherein determining whether the access attempt can be made or not based on the access category involves determining an access attempt threshold value, that is associated with the access category of the access attempt.

According to a twelfth aspect, provided in addition to the eleventh aspect, determining whether the access attempt can be made or not involves determining a second random value and comparing the second random value against the access attempt threshold value.

According to a thirteenth aspect, provided in addition to the eleventh aspect, determining whether the access attempt can be made or not involves comparing the same random value, to be used for selecting the random access procedure type, against the access attempt threshold value. In an optional implementation, in case of determining that the access attempt can be made based on the one or more access identities, selecting the random access procedure type involves normalizing the random access type threshold value based on the access attempt threshold value, such that for example a probability of performing the random access procedure of one type in case of a successful attempt based on the access identity is the same or similar as a probability of performing the random access procedure of the same one type in case of a successful attempt based on the access category.

According to a fourteenth aspect, provided in addition to any of the tenth to thirteenth aspects, the plurality of random access type threshold values relate to the use of one of the various types of the random access procedure, such as a 2-step random access procedure or a 4-step random access procedure. In an optional implementation, the random value being lower than the random access type threshold value is associated with a first type of the random access procedure, and wherein the random value being larger or equal to the random access type threshold value is associated with a second type of the random access procedure. In an optional implementation, the random value is a non-integer value determined between 0 and 1, and the random access type threshold is also a non-integer value between 0 and 1.

According to a fifteenth aspect, provided in additional to any of the tenth to fourteenth aspects, among the plurality of random access type threshold values there is one random access type threshold value associated with each of different random access trigger events that trigger the UE to perform a random access procedure, wherein selecting the one random access type threshold value involves determining the random access type threshold value that is associated with the random access trigger that triggered the random access procedure to be performed. Additionally or alternatively, among the plurality of random access type threshold values there is one random access type threshold value associated with each of different access categories of an access attempt, wherein selecting the one random access type threshold value involves determining the random access type threshold value that is associated with the access category of the access attempt.

Additionally or alternatively, among the plurality of random access type threshold values there is one random access type threshold value associated with each of different set of channel qualities, wherein selecting the one random access type threshold value involves 1) determining the channel quality of a radio link between the UE and a base station via which the random access procedure is to be performed, and 2) determining the random access type threshold value that is associated with the determined channel quality. Additionally or alternatively, among the plurality of random access type threshold values there is one random access type threshold value associated with each of different radio cells of a base station, and wherein selecting the one random access type threshold value involves determining the random access type threshold value associated with the radio cell over which the random access procedure is to be performed, optionally wherein the different radio cells are a primary radio cell and one or more secondary radio cells.

Hardware and Software Implementation of the Present Disclosure

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC (integrated circuit), a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus.

Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT).

The communication may include exchanging data through, for example, a cellular system, a wireless LAN system, a satellite system, etc., and various combinations thereof.

The communication apparatus may comprise a device such as a controller or a sensor, which is coupled to a communication device performing a function of communication described in the present disclosure. For example, the communication apparatus may comprise a controller or a sensor that generates control signals or data signals, which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc. It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive. The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A user equipment (UE) comprising:
a receiver, which in operation, receives a plurality of random access type threshold values, and
processing circuitry, which in operation, determines a random value,
wherein the processing circuitry, in operation, selects a type of a random access procedure to be performed by the UE, wherein the selecting comprises at least
selecting one out of the plurality of random access type threshold values,
comparing the determined random value against the selected random access type threshold value, and
selecting a type of the random access procedure based on the result of the comparison,
wherein the processing circuitry, in operation, determines whether to make an access attempt to a radio cell, wherein the access attempt is associated with one or more access identities and one access category, and wherein the determining is:
first based on the one or more access identities, and
in case the access attempt is determined to be not made based on the one or more access identities, based on the access category using an access attempt threshold value associated with the access category, and
the UE, in operation, makes the access attempt by performing the random access procedure of the selected type.

2. The user equipment according to claim 1, wherein the determining whether to make the access attempt involves determining a second random value and comparing the second random value against the access attempt threshold value.

3. The user equipment according to claim 1, wherein the determining whether to make the access attempt involves comparing the random value against the access attempt threshold value,
wherein in case the access attempt is determined to be made based on the one or more access identities, the selecting the random access procedure type involves normalizing the random access type threshold value based on the access attempt threshold value, such that a probability of performing the random access procedure of one type in case of a successful access attempt based on the access identity is the same or similar as a probability of performing the random access procedure of the same one type in case of a successful access attempt based on the access category.

4. The user equipment according to claim 1, wherein the plurality of random access type threshold values relate to one of various types of the random access procedure including a 2-step random access procedure or a 4-step random access procedure, and
wherein the random value lower than the random access type threshold value is associated with a first type of the random access procedure, and the random value larger or equal to the random access type threshold value is associated with a second type of the random access procedure, and
the random value is a non-integer value determined between 0 and 1, and the random access type threshold is also a non-integer value between 0 and 1.

5. The user equipment according to claim 1,
wherein among the plurality of random access type threshold values there is one random access type threshold value associated with one of different random access trigger events that trigger the UE to perform a random access procedure, wherein selecting the one random access type threshold value involves determining the random access type threshold value that is associated with the random access trigger that triggered the random access procedure to be performed, and/or
wherein among the plurality of random access type threshold values there is one random access type threshold value associated with one of different access categories of an access attempt, wherein selecting the one random access type threshold value involves determining the random access type threshold value that is associated with the access category of the access attempt, and/or
wherein among the plurality of random access type threshold values there is one random access type threshold value associated with one of different set of channel qualities, wherein selecting the one random access type threshold value involves 1) determining the channel quality of a radio link between the UE and a base station via which the random access procedure is to be performed, and 2) determining the random access type threshold value that is associated with the determined channel quality, and/or
wherein among the plurality of random access type threshold values there is one random access type threshold value associated with one of different radio cells of a base station, and wherein selecting the one random access type threshold value involves determining the random access type threshold value associated with the radio cell over which the random access procedure is to be performed, wherein the different radio cells are a primary radio cell and one or more secondary radio cells.

6. The user equipment according to claim 5,
wherein the receiver, when in operation, receives a system information broadcast from a base station in a radio cell, wherein the system information includes one or more of:
information on an association between the random access type threshold value and the random access trigger event,
information on an association between the random access type threshold value and the access category, together with information on an association between the access attempt threshold value and the access category,
information on an association between the random access type threshold value and the channel quality,
information on an association between the random access type threshold value and the radio cell over which the random access procedure is to be performed.

7. The user equipment according to claim 1, wherein the receiver, when in operation, receives a single random access threshold value from a base station in a radio cell to be used for selecting a type of random access procedure instead of using one out of the plurality of random access type threshold values, and
wherein the single random access threshold value is received in a message of a failed random access procedure performed between the base station and the UE, in a random access response of the failed random access procedure, or in a message of a handover procedure performed by the UE with a source and target base station.

8. The user equipment according to claim 1, wherein the random access procedure is one of a 2-step random access procedure or a 4-step random access procedure, wherein for the 2-step random access procedure:
a transmitter of the UE, when in operation, transmits a random access preamble and uplink data to a base station, and
the receiver, when in operation, receives a random access response and information on a contention resolution,
and wherein for the 4-step random access procedure:
a transmitter of the UE, when in operation, transmits a random access preamble to a base station,
the receiver, when in operation, receives a random access response, indicating radio resources to be used by the UE,
the transmitter, when in operation, transmits uplink data using the indicated radio resources, and
the receiver, when in operation, receives information on a contention resolution.

9. A method performed by a user equipment (UE), the method comprising:
receiving a plurality of random access type threshold values,
determining a random value,
selecting a type of a random access procedure to be performed by the UE, wherein the selecting comprises at least
selecting one out of the plurality of random access type threshold values,
comparing the determined random value against the selected random access type threshold value, and
selecting a type of the random access procedure based on the result of the comparison,
determining whether to make an access attempt to a radio cell, wherein the access attempt is associated with one or more access identities and one access category, and wherein the determining is:
first based on the one or more access identities, and
in case the access attempt is determined to be not made based on the one or more access identities, based on the access category using an access attempt threshold value associated with the access category, and
making the access attempt by performing the random access procedure of the selected type.

10. The method according to claim 9, wherein the determining whether to make the access attempt involves determining a second random value and comparing the second random value against the access attempt threshold value.

11. The method according to claim 9, wherein the determining whether to make the access attempt involves comparing the random value against the access attempt threshold value,
wherein in case the access attempt is determined to be made based on the one or more access identities, the selecting the random access procedure type involves normalizing the random access type threshold value based on the access attempt threshold value, such that a probability of performing the random access procedure of one type in case of a successful access attempt based on the access identity is the same or similar as a probability of performing the random access procedure of the same one type in case of a successful access attempt based on the access category.

12. The method according to claim 9, wherein the plurality of random access type threshold values relate to one of various types of the random access procedure including a 2-step random access procedure or a 4-step random access procedure, and
wherein the random value lower than the random access type threshold value is associated with a first type of the random access procedure, and the random value larger or equal to the random access type threshold value is associated with a second type of the random access procedure, and
the random value is a non-integer value determined between 0 and 1, and the random access type threshold is also a non-integer value between 0 and 1.

13. The method according to claim 9,
wherein among the plurality of random access type threshold values there is one random access type threshold value associated with one of different random access trigger events that trigger the UE to perform a random access procedure, wherein selecting the one random access type threshold value involves determining the random access type threshold value that is associated with the random access trigger that triggered the random access procedure to be performed, and/or
wherein among the plurality of random access type threshold values there is one random access type threshold value associated with one of different access categories of an access attempt, wherein selecting the one random access type threshold value involves determining the random access type threshold value that is associated with the access category of the access attempt, and/or
wherein among the plurality of random access type threshold values there is one random access type threshold value associated with one of different set of channel qualities, wherein selecting the one random access type threshold value involves 1) determining the channel quality of a radio link between the UE and a base station via which the random access procedure is to be performed, and 2) determining the random access type threshold value that is associated with the determined channel quality, and/or
wherein among the plurality of random access type threshold values there is one random access type threshold value associated with one of different radio cells of a base station, and wherein selecting the one random access type threshold value involves determining the random access type threshold value associated with the radio cell over which the random access procedure is to be performed, wherein the different radio cells are a primary radio cell and one or more secondary radio cells.

14. A base station comprising:
processing circuitry, which in operation, configures a plurality of random access type threshold values and an access attempt threshold value, and
a transmitter, which in operation, transmits information on the plurality of random access type threshold values and the access attempt threshold value to a user equipment (UE),
wherein the processing circuitry, in operation, performs a random access procedure initiated by the UE according to a random access procedure type selection, wherein the random access procedure type selection comprises at least
selecting one out of the plurality of random access type threshold values, comparing a random value against the selected random access type threshold value, and
selecting a type of the random access procedure based on the result of the comparison,
wherein the random access procedure is initiated according to an access attempt determination whether or not to make an access attempt to a radio cell, wherein the access attempt is associated with one or more access identities and one access category, and wherein the access attempt determination is:
first based on the one or more access identities, and
in case the access attempt is determined to be not made based on the one or more access identities, based on the access category using an access attempt threshold value associated with the access category.

* * * * *